(12) United States Patent
Hasebe et al.

(10) Patent No.: US 7,631,894 B2
(45) Date of Patent: Dec. 15, 2009

(54) AIRBAG DEVICE

(75) Inventors: Masahiro Hasebe, Minato-ku (JP); Yukitoshi Narimoto, Minato-ku (JP)

(73) Assignee: Takata Corporation, Tokyo (JP)

( * ) Notice: Subject to any disclaimer, the term of this patent is extended or adjusted under 35 U.S.C. 154(b) by 304 days.

(21) Appl. No.: 11/459,769

(22) Filed: Jul. 25, 2006

(65) Prior Publication Data
US 2007/0018437 A1   Jan. 25, 2007

(30) Foreign Application Priority Data
Jul. 25, 2005   (JP)  ............................ 2005-214522

(51) Int. Cl.
B60R 21/16   (2006.01)
(52) U.S. Cl. .................................. 280/743.2
(58) Field of Classification Search ............... 280/743.2
See application file for complete search history.

(56) References Cited

U.S. PATENT DOCUMENTS

| | | | |
|---|---|---|---|
| 5,022,675 A | | 6/1991 | Zelenak, Jr. et al. |
| 5,221,108 A | * | 6/1993 | Hirabayashi ............. 280/728.3 |
| 5,865,466 A | * | 2/1999 | Yamamoto et al. ........ 280/743.1 |
| 6,070,904 A | * | 6/2000 | Ozaki et al. ............. 280/743.1 |
| 6,099,026 A | * | 8/2000 | Ando et al. .............. 280/728.3 |
| 6,206,409 B1 | * | 3/2001 | Kato et al. .............. 280/728.2 |
| 6,585,292 B2 | * | 7/2003 | Abe et al. ................ 280/743.1 |
| 6,682,093 B2 | * | 1/2004 | Tajima et al. .............. 280/732 |
| 6,834,886 B2 | | 12/2004 | Hasebe et al. |
| 6,955,377 B2 | * | 10/2005 | Cooper et al. ............. 280/743.1 |
| 7,125,043 B2 | * | 10/2006 | Amamori .................. 280/743.1 |
| 7,314,228 B2 | * | 1/2008 | Ishiguro et al. ........... 280/728.2 |
| 7,357,408 B2 | * | 4/2008 | Hall et al. ................. 280/728.2 |
| 7,370,880 B2 | * | 5/2008 | Hasebe ........................ 280/729 |
| 2005/0212275 A1 | | 9/2005 | Hasebe |
| 2007/0138779 A1 | * | 6/2007 | Kwon ....................... 280/743.2 |

FOREIGN PATENT DOCUMENTS

| | | |
|---|---|---|
| EP | 1 338 482 A1 | 8/2003 |
| EP | 1 452 403 A1 | 9/2004 |
| EP | 1 580 083 A2 | 9/2005 |
| JP | 2005082021 | 3/2005 |
| JP | 10-71911 | 3/2006 |

OTHER PUBLICATIONS

A search report dated Nov. 23, 2006, from the European Patent Office in corresponding European Application No. 06013374.1-1523.

* cited by examiner

*Primary Examiner*—Paul N Dickson
*Assistant Examiner*—Nicole Verley
(74) *Attorney, Agent, or Firm*—Fitch, Even, Tabin & Flannery

(57) ABSTRACT

An airbag device is provided in which an airbag having a left airbag section and a right airbag section is folded by a new folding method. An airbag includes a left airbag section inflated on the left in front of a passenger; a right airbag section inflated on the right in front of the passenger; and a base chamber that connects ends of the left airbag section and the right airbag section. When the left airbag section and the right airbag section are folded, the lower halves of the bags and from a connecting band are folded back upward along a line $L_1$ that connects the lower edge of the connecting band and the lower edge of the fixing plate.

7 Claims, 21 Drawing Sheets

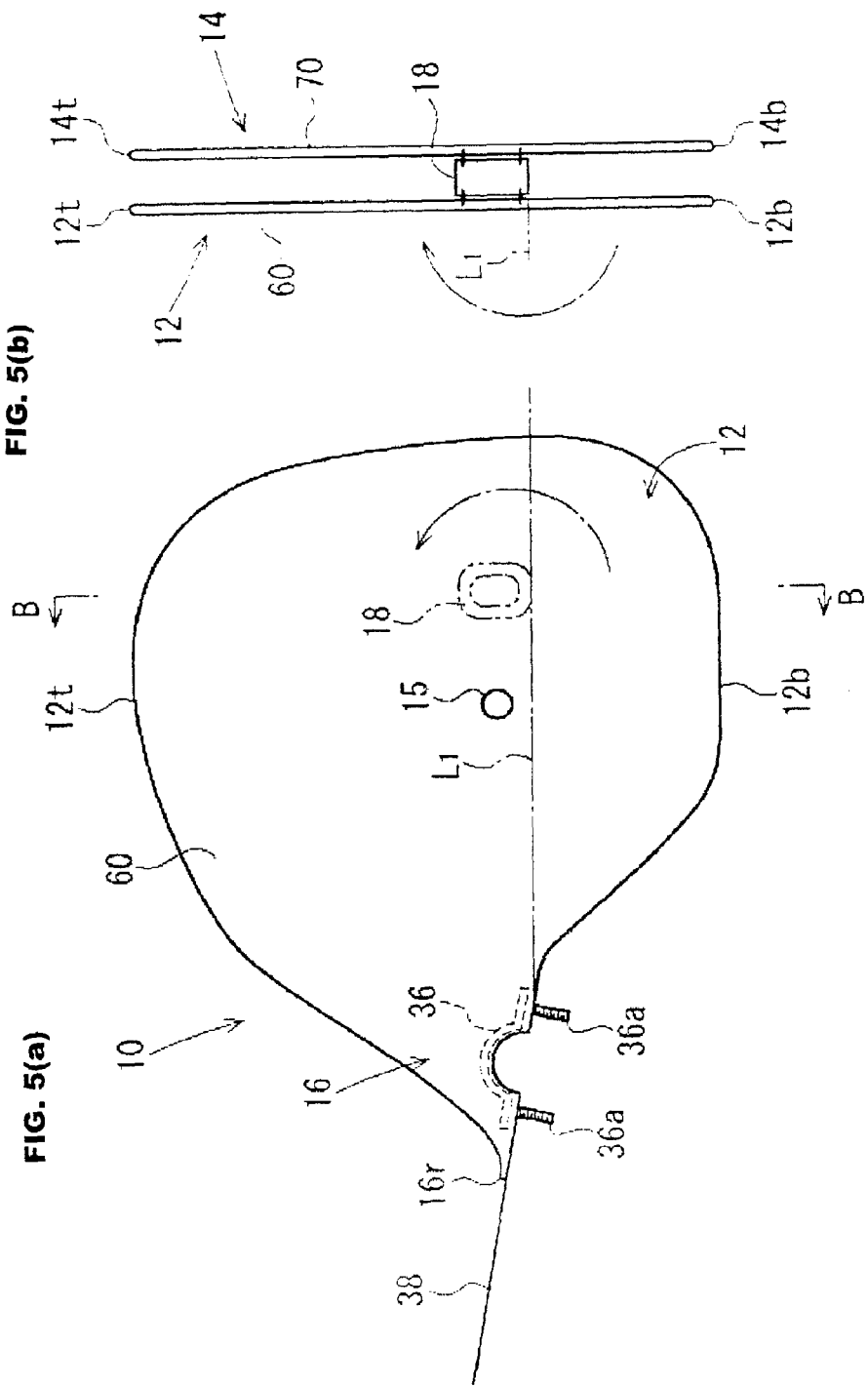

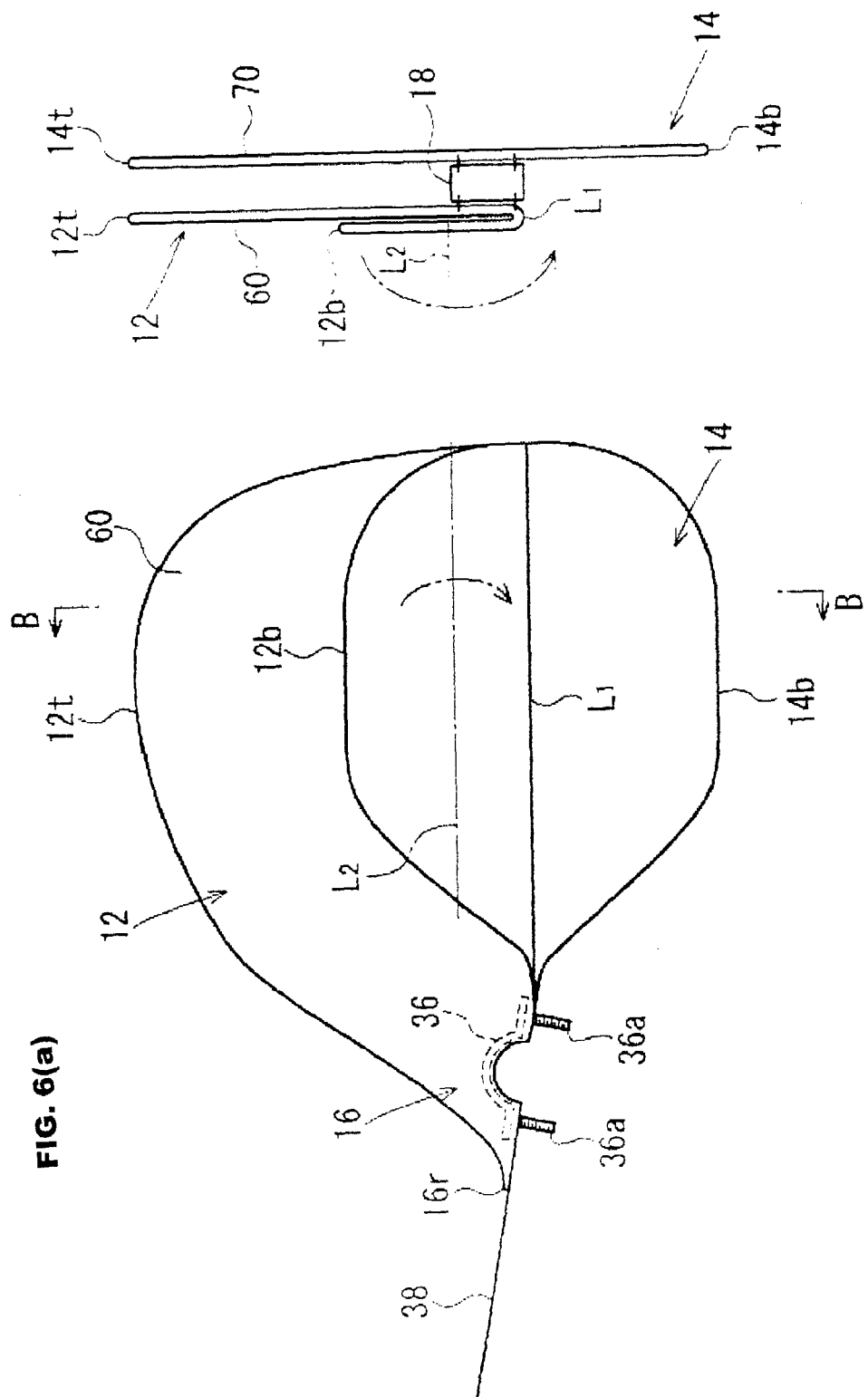

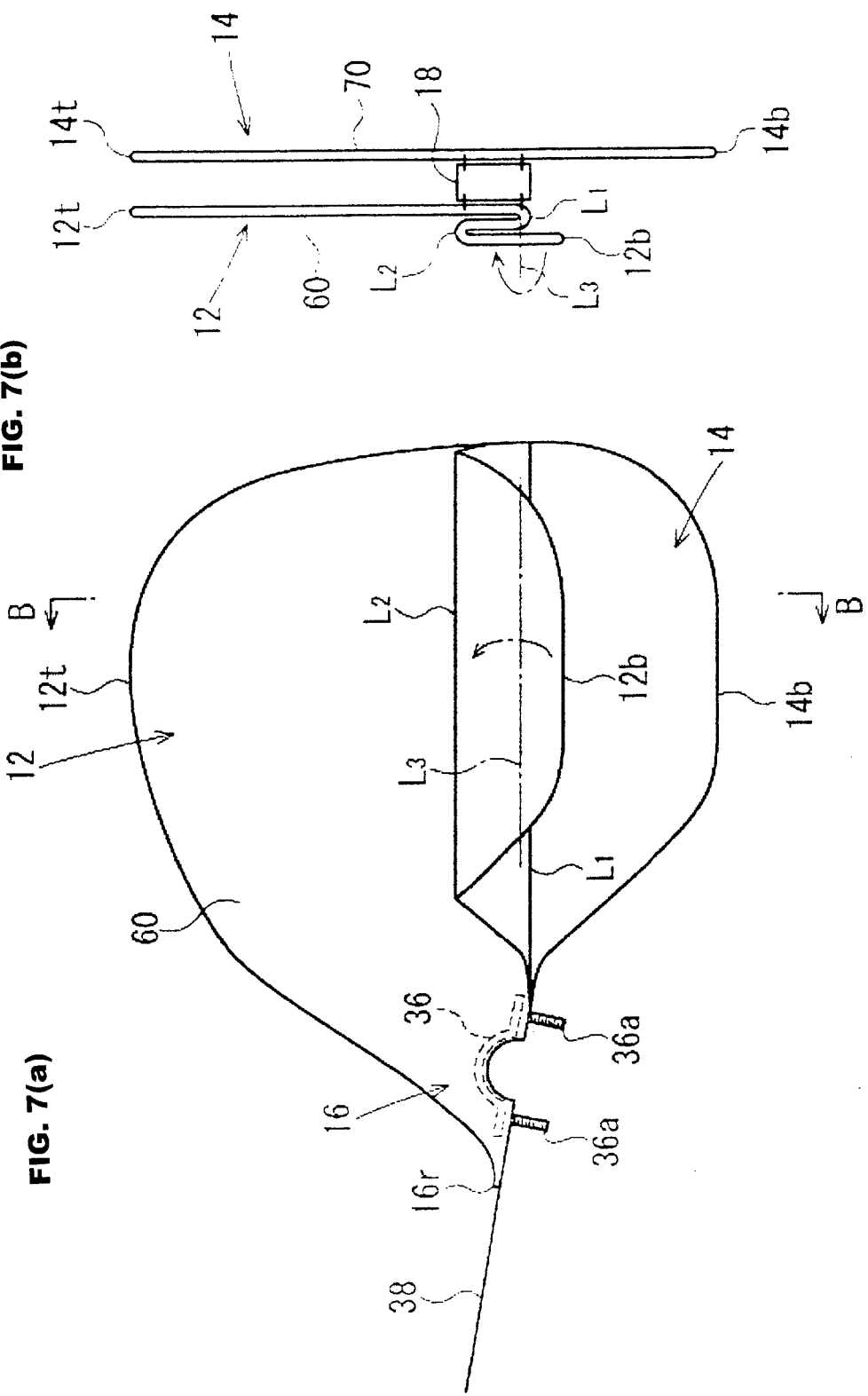

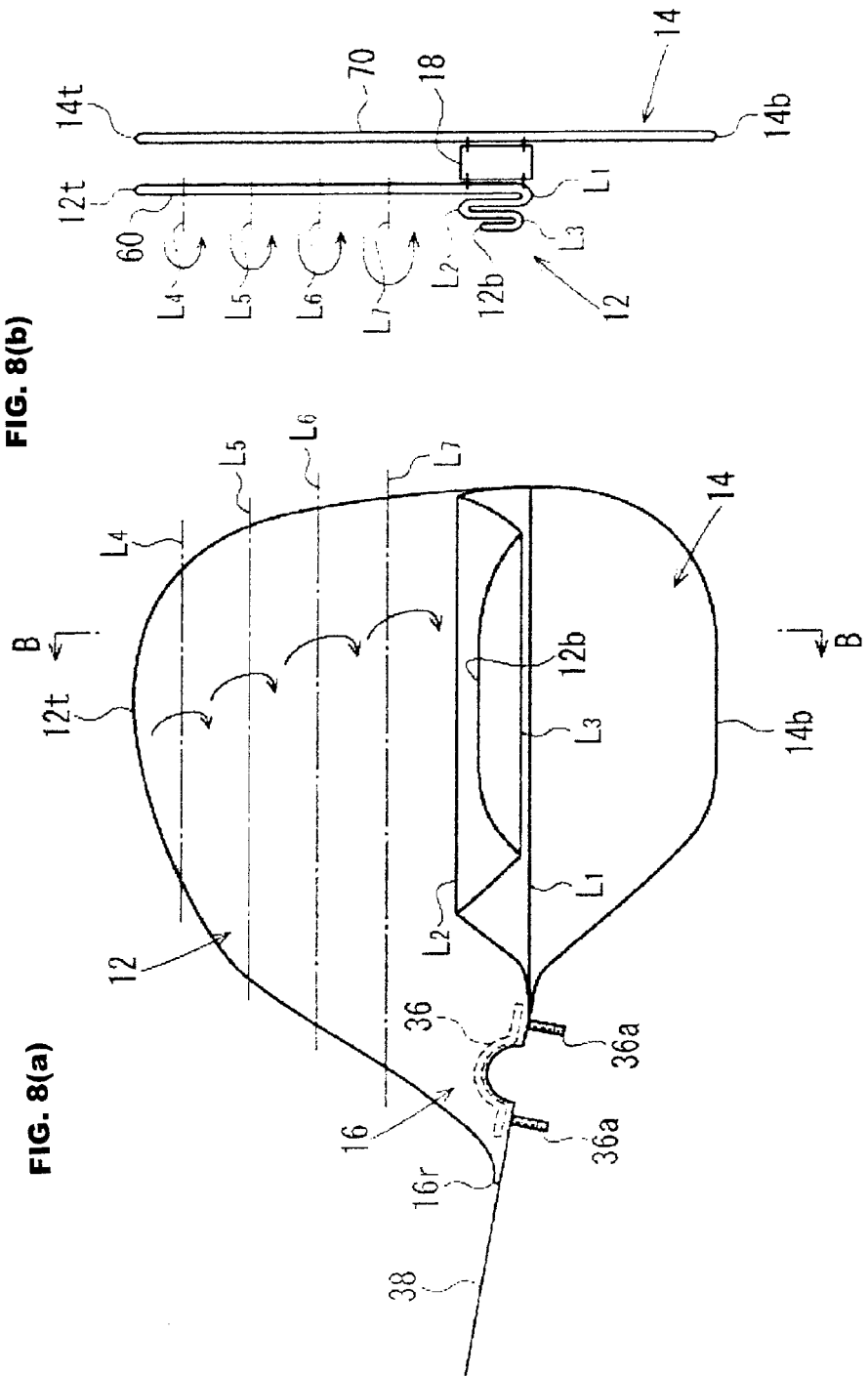

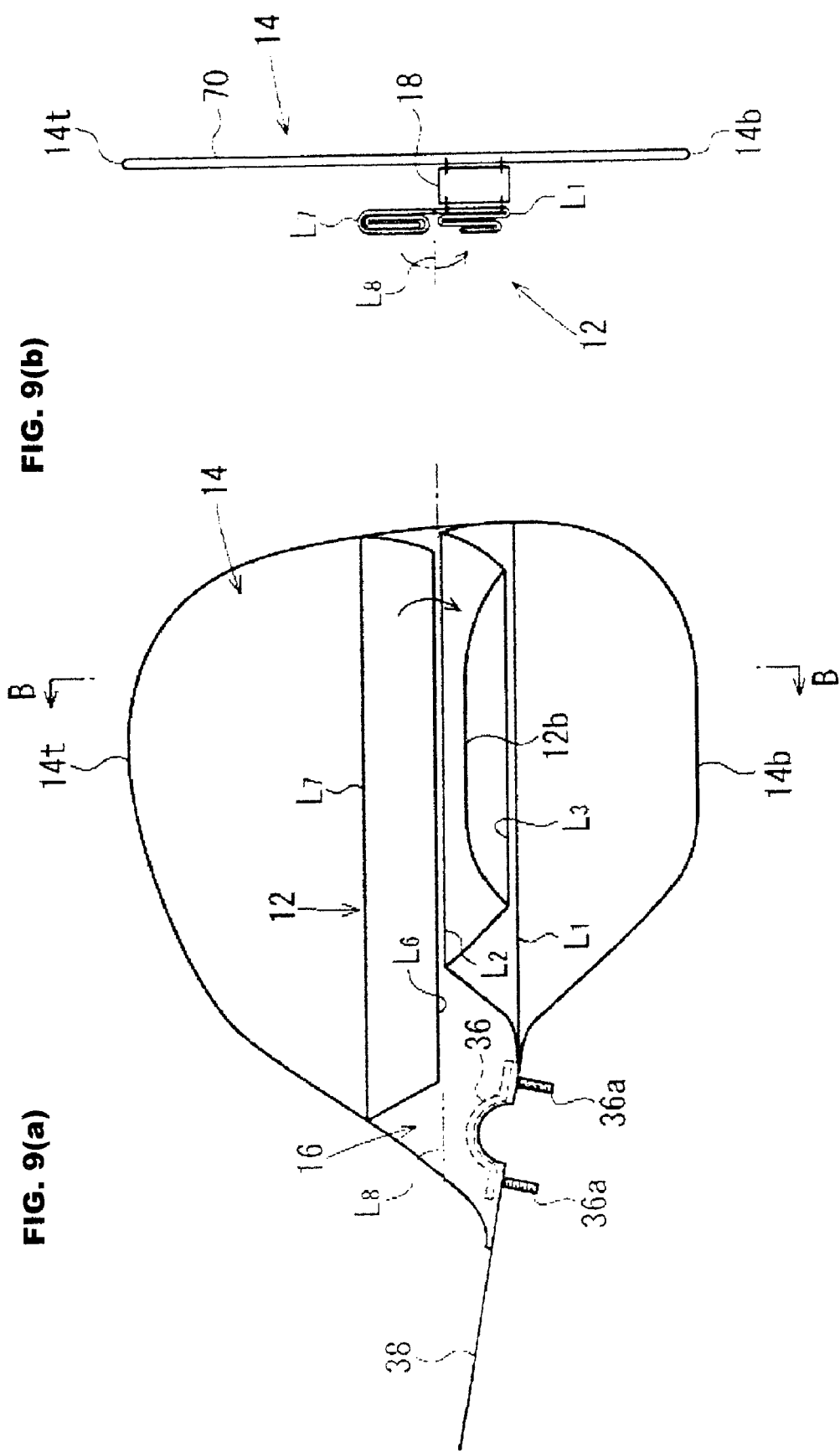

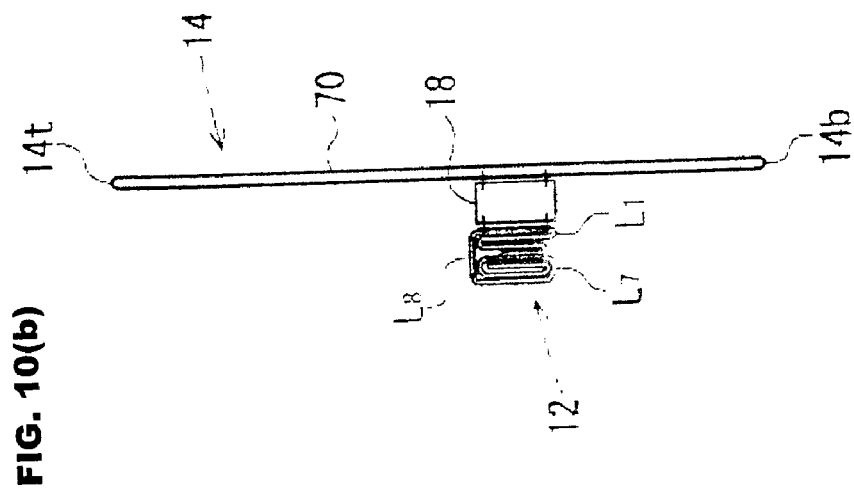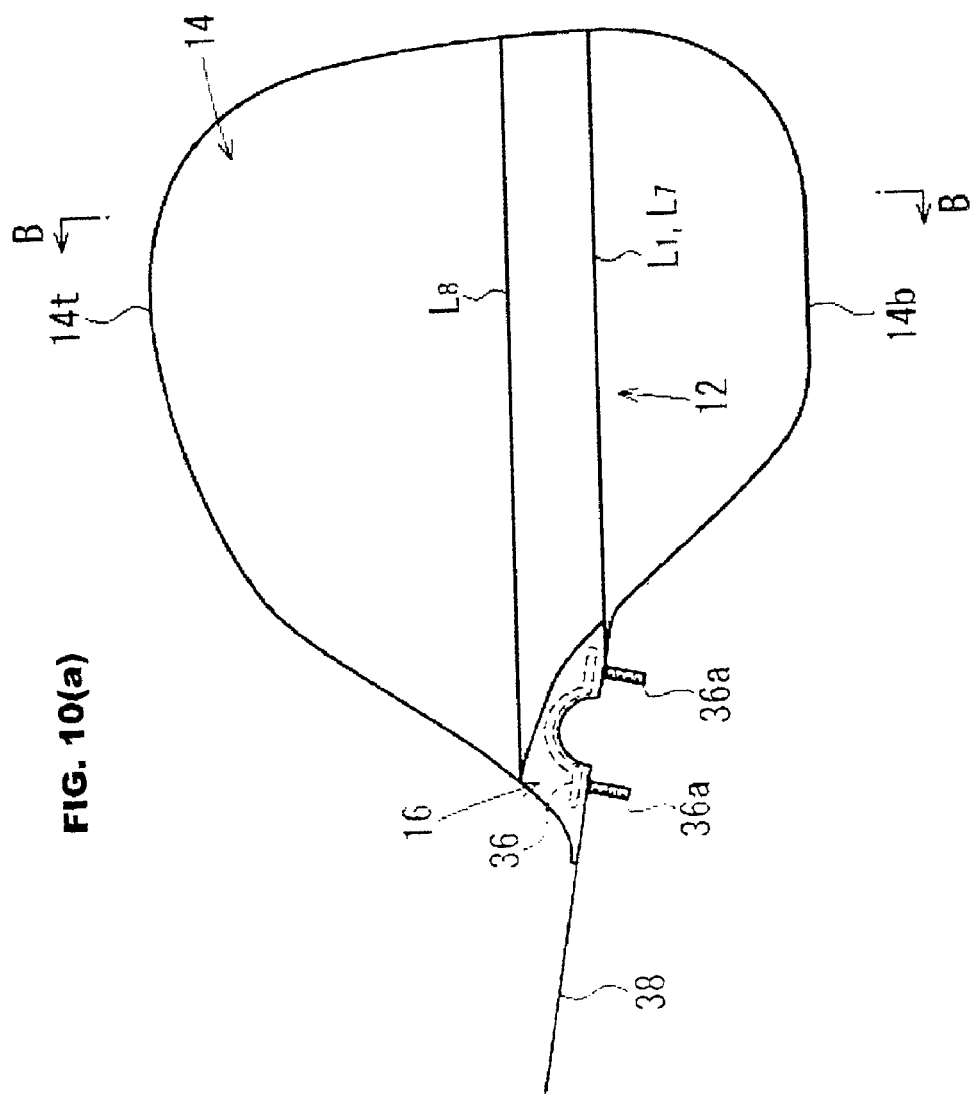

AIRBAG DEVICE

FIELD OF THE INVENTION

The present invention relates to an airbag device including an airbag that is inflated at the time of a vehicle collision to receive a passenger, and more specifically, it relates to an airbag device including an airbag having a left airbag section and a right airbag section that are inflated on the right and left, respectively, in front of a passenger.

BACKGROUND OF THE INVENTION

Japanese Unexamined Patent Application Publication No. 2004-268903 discloses an airbag for receiving a passenger at the time of a vehicle collision and a folding method thereof in which the airbag has a left airbag section and a right airbag section that are inflated on the right and left, respectively, in front of a passenger and is adapted to be inflated by an inflator common to the airbag sections. In the airbag disclosed in the publication, the left airbag section and the right airbag section are not connected to each other, and middle portions of the airbag sections in the fore-and-aft direction thereof are connected by a connecting part.

In the above publication, portions of the airbag sections closer to their leading ends than the connecting part are folded along vertical folding lines, respectively, so as to be primary folded bodies, and then, the primary folded bodies are folded to be smaller.

This airbag is folded and accommodated within a case and covered with a cover. When the inflator (gas generator) begins to discharge gas at the time of a vehicle collision, the airbag is inflated toward the front of a passenger while pushing the cover open.

SUMMARY OF THE INVENTION

Accordingly, the object of the present invention is to provide an airbag device made by folding an airbag having a left airbag section and a right airbag section with a folding method different from that disclosed in Japanese Unexamined Patent Application Publication No. 2004-268903.

An airbag device according to a first form of the invention is an airbag device including a folded airbag, a case accommodating the airbag, and an inflator for inflating the airbag. The airbag on a leading-end side is inflated in a direction away from a base-end side of the airbag by gas discharged from the inflator disposed on the base end side. The airbag includes a base end part having a gas introducing port for receiving gas from the inflator, a left airbag section that is connected to the base end part and inflated on the left in front of a passenger, and a right airbag section that is connected to the base end part and inflated on the right in front of the passenger. The left airbag section and the right airbag section have leading ends which are not connected to each other, whereby a space to be opened toward the passenger is formed between the leading ends of the left airbag section and the right airbag section when inflated. Middle portions of the left airbag section and the right airbag section in their inflation direction are connected to each other by a connecting part. The airbag is primarily folded so as to form a primary folded body elongated in the forward and rearward direction and is folded so to have a smaller longitudinal width at the leading-end side and the rear-end side of the inflating direction from the connecting part. The first folding of the primary folding is performed along the connecting part.

An airbag device according to a second form is the airbag device according to the first form, in which a fixture for fixing the edge part of the gas introducing port to the case is disposed in the airbag, and the first folding is performed along a line that connects the edge part of the fixture and the edge part of the connecting part.

An airbag device according to a third form is the airbag device according to the second form, in which the first folding is performed in such a manner that the lower side of the left airbag section or the right airbag section is folded back along the lower edge of the fixture and the lower edge of the connecting part in the mounting direction of the airbag device on a vehicle.

An airbag device according to a fourth form is an airbag device including a folded airbag, a case accommodating the airbag, and an inflator for inflating the airbag. The airbag on a leading-end side is inflated in a direction away from a base-end side of the airbag by gas discharged from the inflator disposed on the base end side. The airbag includes a base end part having a gas introducing port for receiving gas from the inflator, a left airbag section that is connected to the base end part and inflated on the left in front of a passenger, and a right airbag section that is connected to the base end part and inflated on the right in front of the passenger. The left airbag section and the right airbag section have leading ends which are not connected to each other, whereby a space to be opened toward the passenger is formed between the leading ends of the left airbag section and the right airbag section when inflated. Middle portions of the left airbag section and the right airbag section in their inflation direction are connected to each other by a connecting part. The airbag is primarily folded so as to form a primary folded body elongated in one direction and then folded along a reverse-folding line perpendicular to said one direction. An indicative portion is provided for indicating the folding position when the first folding of the primary folding is performed.

An airbag device according to a fifth form is the airbag device according to the fourth form, in which the airbag includes a vent hole, and the vent hole functions as the indicative portion.

An airbag device according to a sixth form is the airbag device according to any one of the previous forms, in which folding of the primary folding after the first folding is performed along a line parallel to the folding line of the first folding. In an airbag device according to the present invention, when an inflator operates so as to inflate the airbag, a left airbag section receives a passenger's left chest, and a right airbag section receives the passenger's right chest. Hard and strong ribs exist in the left and right chests. The airbag receives and absorbs an impact of the passenger through the ribs. The space exists between the leading ends of the inflated left airbag section and the inflated right airbag section so that the breastbones in the center of the passenger's chest face the space. Thus, if the passenger's body rushes into the airbag, the breastbone region of the chest does not receive a reaction force too much from the airbag. As a result, a burden on the breastbones becomes small.

Further, in the invention, in a state in which the airbag is inflated, if the spacing between the front most ends of the left airbag section and the right airbag section is 150 to 450 mm, the inflated left airbag section directly faces a central region of the left chest, and the inflated right airbag section directly faces a central region of the right chest. As a result, the region of the ribs of the upper half of the passenger's body is reliably and securely received by the airbag.

In the airbag device according to the first form, the left airbag section and the right airbag section are primarily folded so as to form primary folded bodies elongated in the forward and rearward direction individually and then folded to a smaller size.

As described in the first form of the invention, the first folding is performed along the connecting part when the airbag is primarily folded so that the position of the first folding is determined to be uniform.

In the airbag device according to the second form, since the first folding is performed along a line that connects the edge part of the fixture and the edge part of the connecting part, the position of the line is determined uniformly by two points.

According to the third form of the invention, the lower side of the left airbag section or the right airbag section is folded back along a line that connects the lower edge of the fixture and the lower edge of the connecting part. Therefore, the position of the first folding in the lower side of the left airbag section or the right airbag section is determined to be uniform.

In the airbag device according to the fourth form, the left airbag section and the right airbag section are primarily folded so as to form primary folded bodies elongated in a direction (for example, forward and rearward direction or upward and downward direction) individually and folded to a smaller size. Since an indicative portion that indicates the position of the first folding is provided, the position of the first folding is determined to be uniform.

In the airbag device according to the fifth form, since the vent hole is used as the indicative portion, exclusive indicative portion is not necessary.

According to the sixth form of the airbag device, the folding of the primary folding after the first folding can be performed parallel to the first folding line which serves as a reference line.

BRIEF DESCRIPTION OF THE DRAWINGS

FIGS. 5(a) and 5(b) are explanatory views showing the process of folding the airbag in FIG. 1.

FIGS. 6(a) and 6(b) are explanatory views showing the process of folding the airbag in FIG. 1.

FIGS. 7(a) and 7(b) are explanatory views showing the process of folding the airbag in FIG. 1.

FIGS. 8(a) and 8(b) are explanatory views showing the process of folding the airbag in FIG. 1.

FIGS. 9(a) and 9(b) are explanatory views showing the process of folding the airbag in FIG. 1.

FIGS. 10(a) and 10(b) are explanatory views showing the process of folding the airbag in FIG. 1.

DETAILED DESCRIPTION OF THE DRAWINGS

Figure 1:
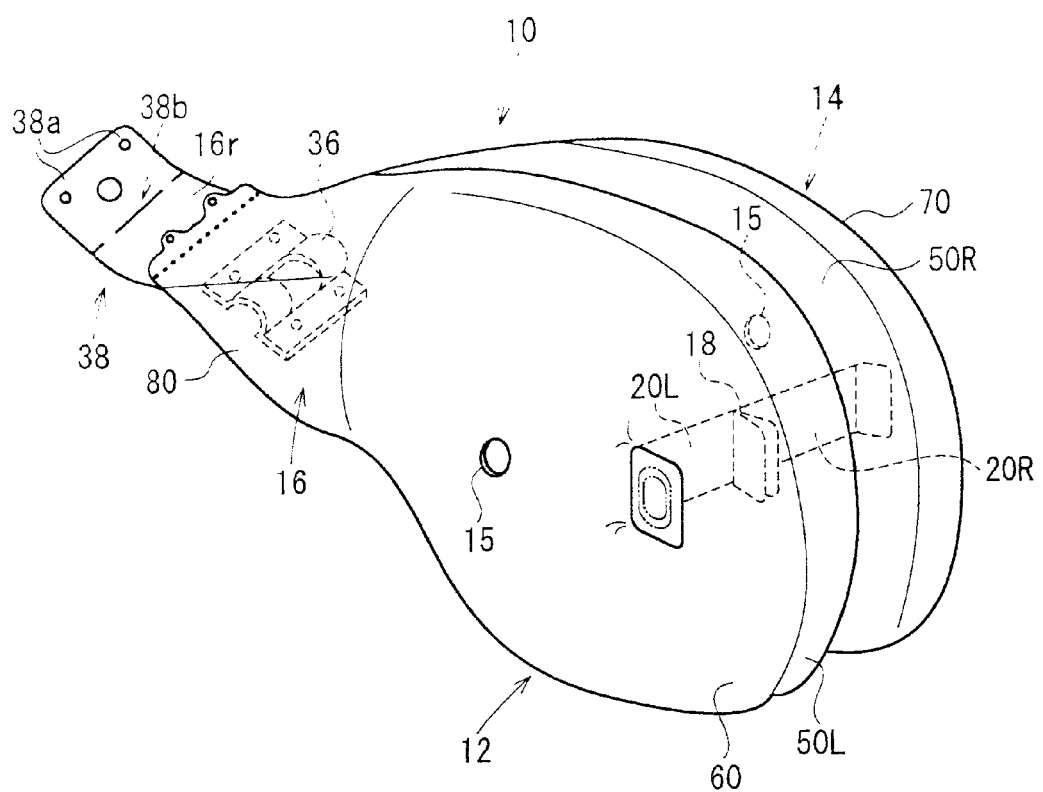
FIG. 1 is a perspective view of an airbag according to an embodiment of the invention.

Referring now to the drawings, an embodiment of the present invention will be described.

Figure 2:
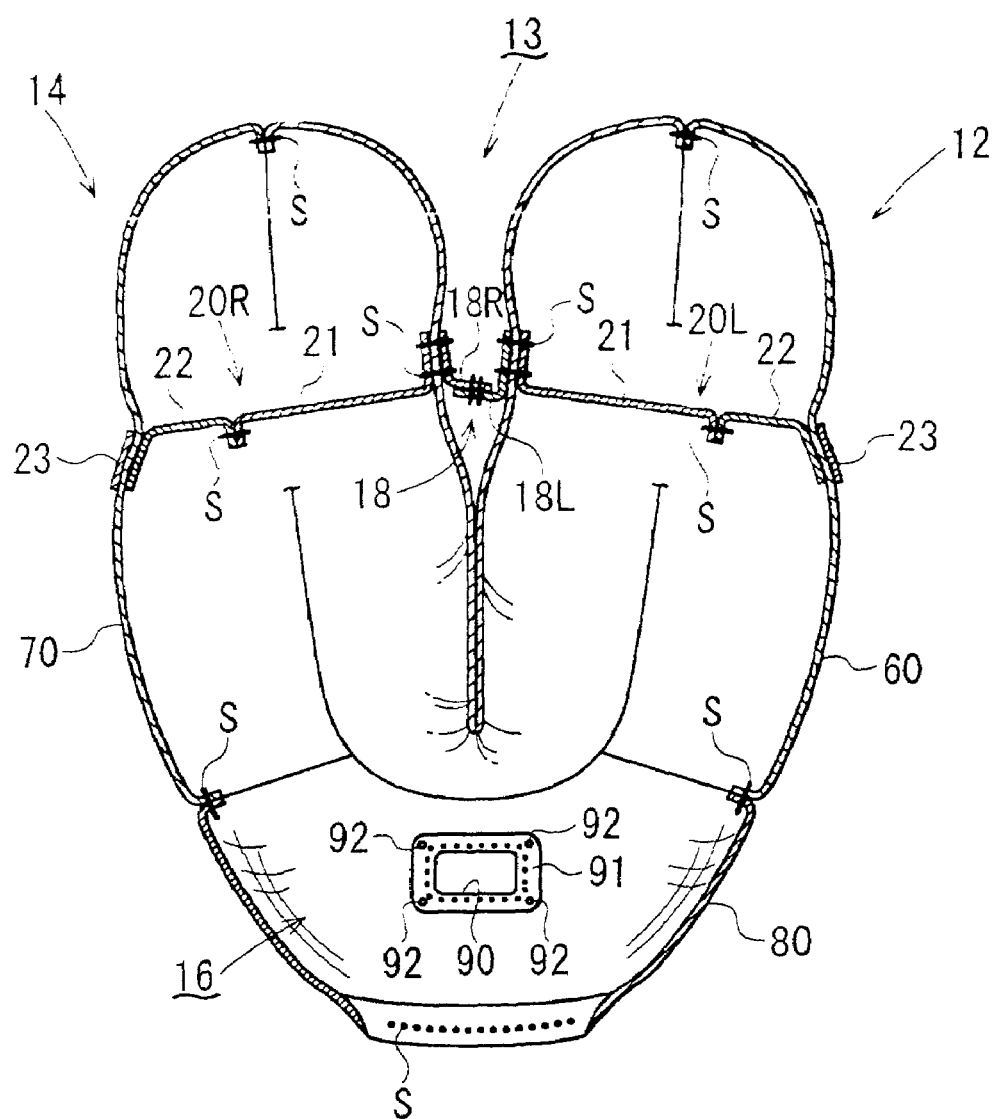
FIG. 2 is a horizontal sectional view of the airbag in FIG. 1.
Figure 3:
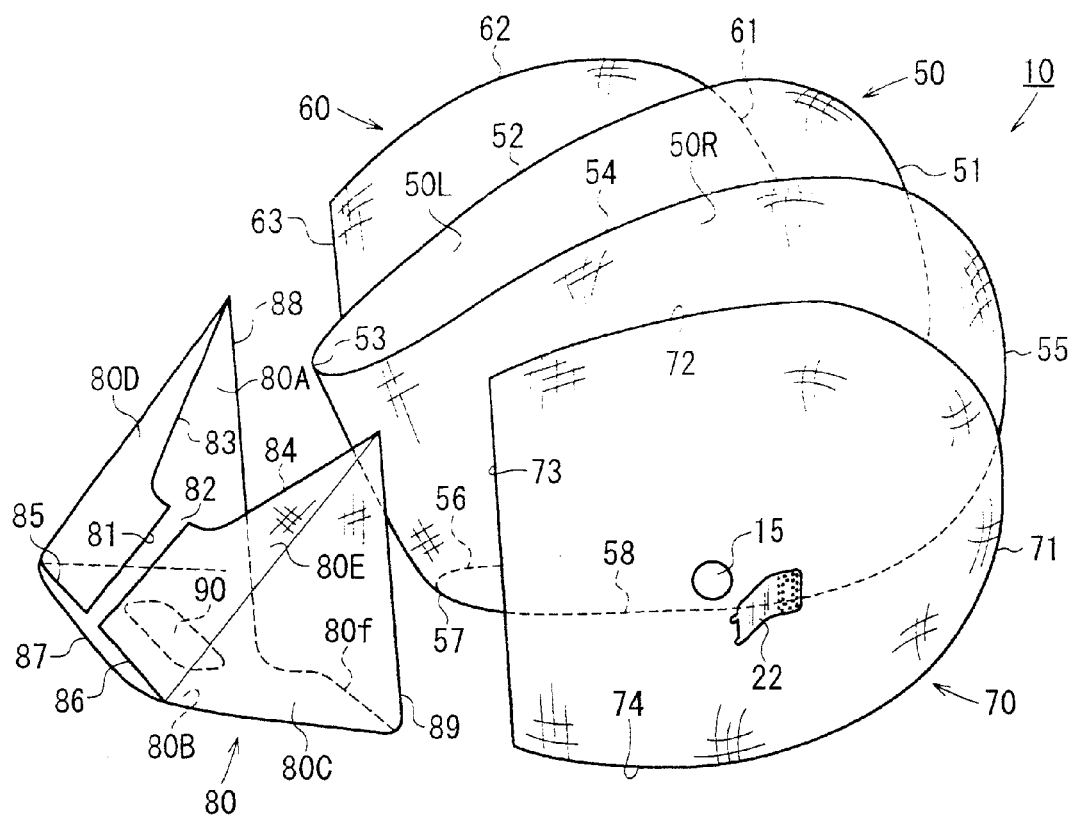
FIG. 3 is an exploded perspective view showing the structure of panels of the airbag in FIG. 1.
Figure 4:
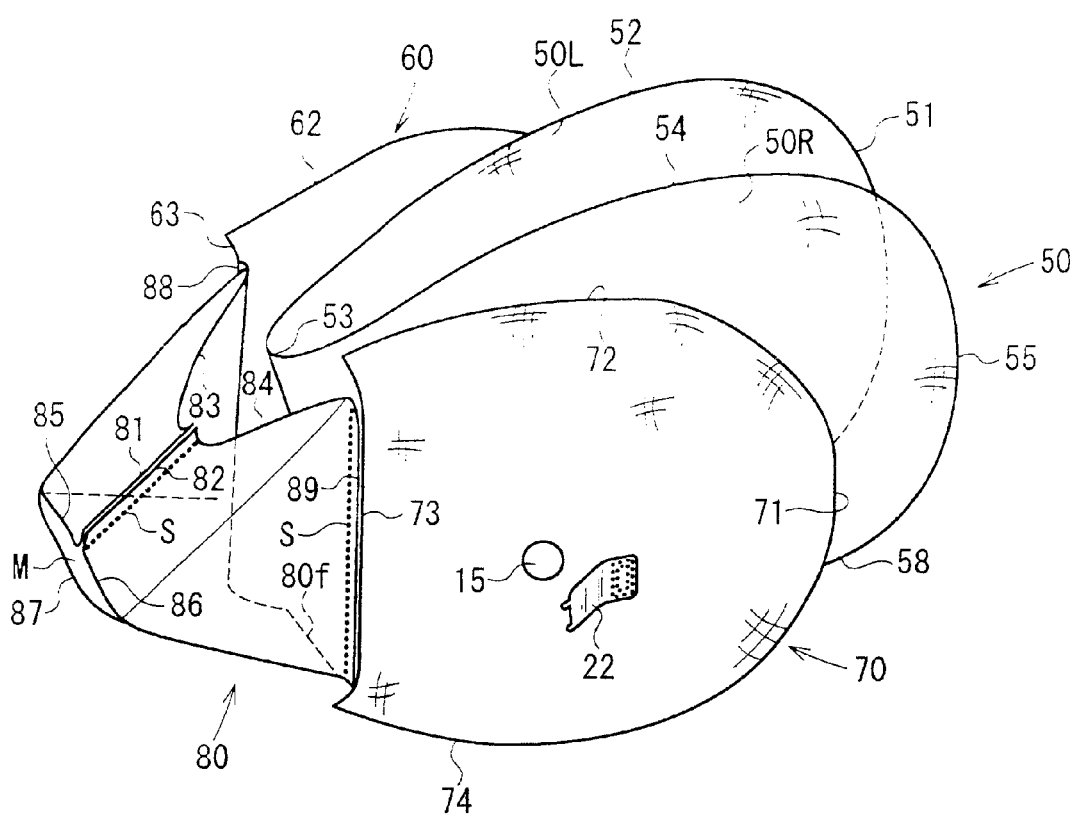
FIG. 4 is an exploded perspective view in the course of sewing the airbag in FIG. 1.
Figure 19:
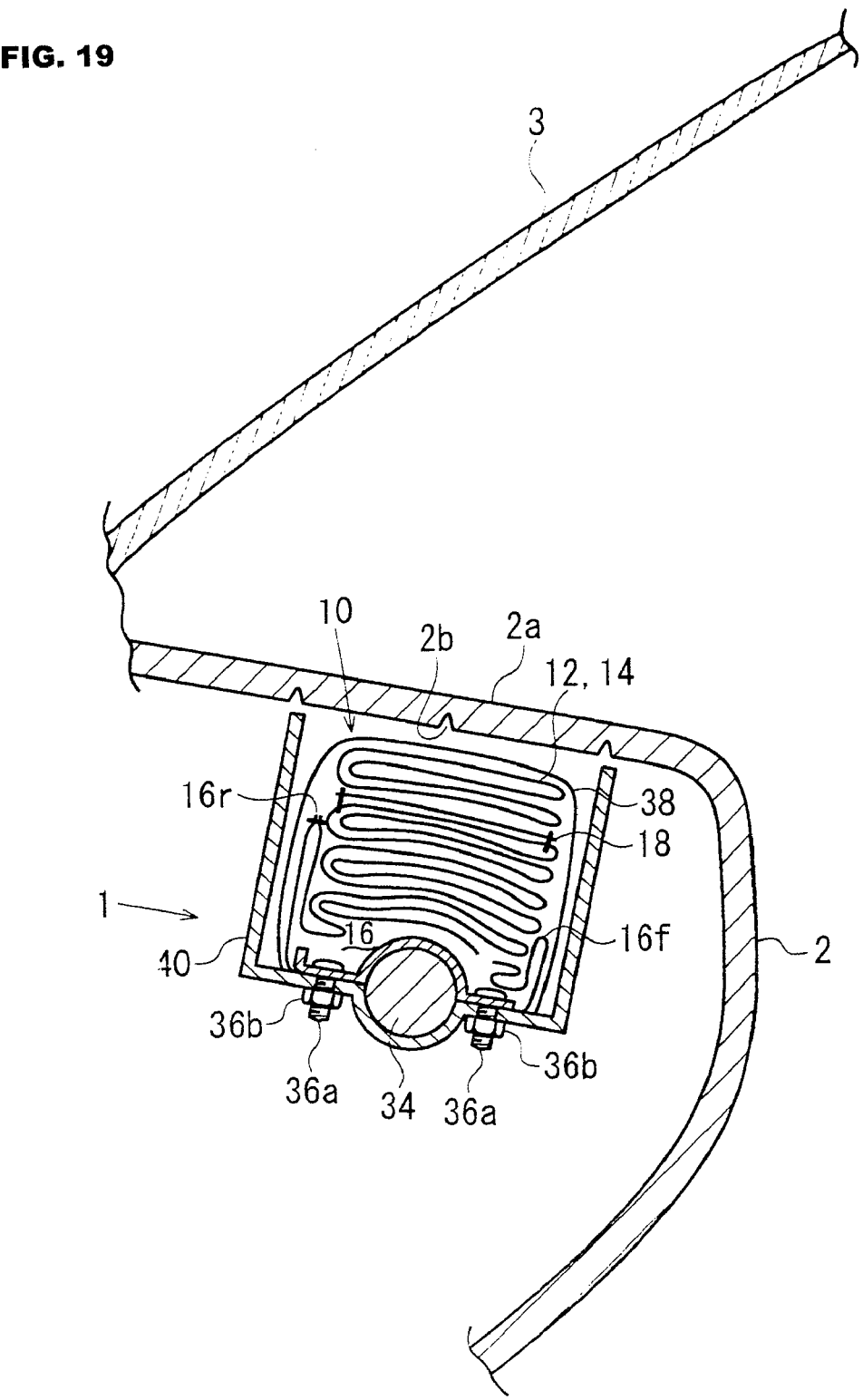
FIG. 19 is a longitudinal sectional view of an airbag device including the folded airbag in FIG. 1.
Figure 20:
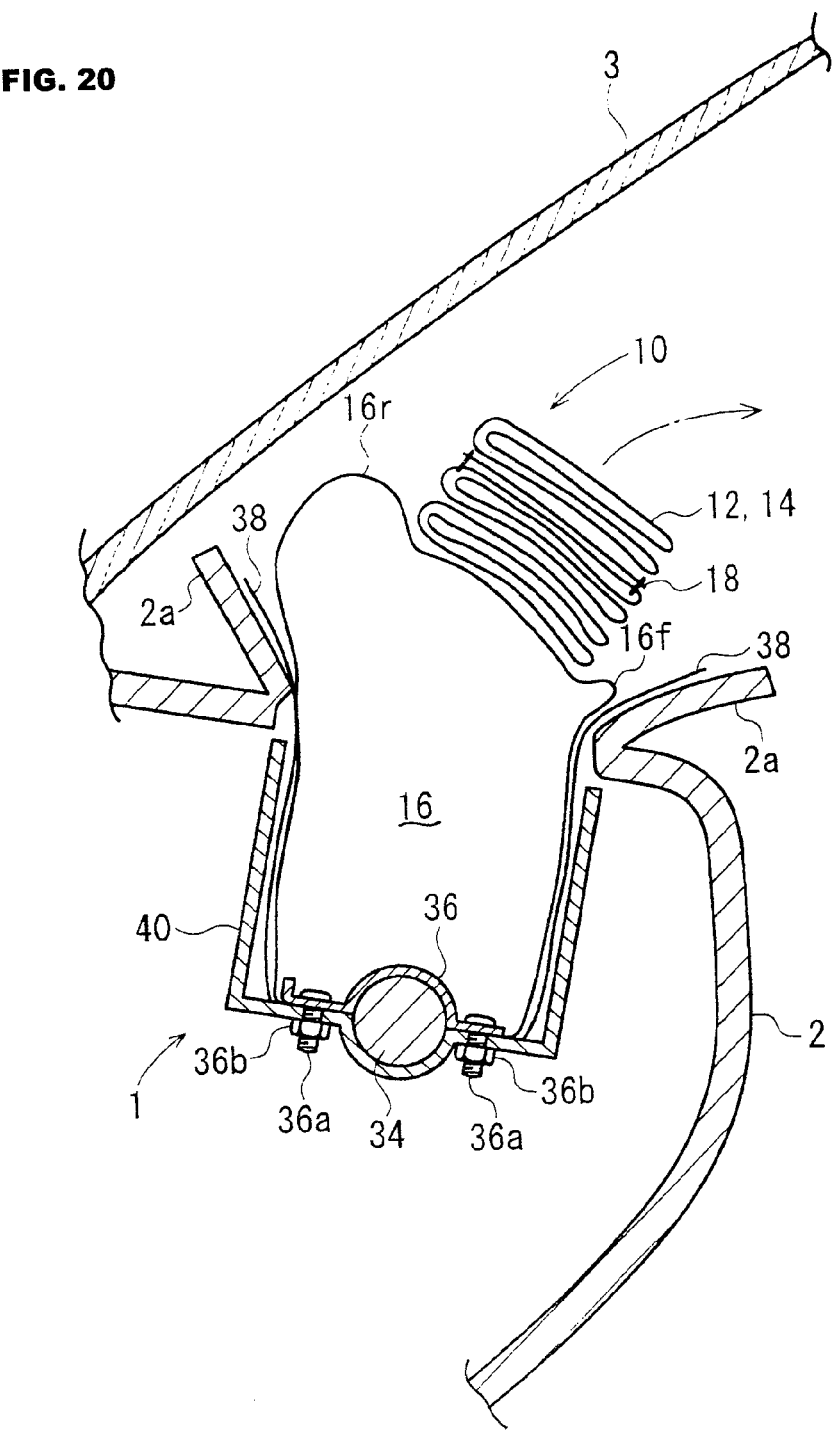
FIG. 20 is a longitudinal sectional view of the airbag of the airbag device in FIG. 19 when being inflated.

FIG. 1 is a perspective view of an airbag according to an embodiment of the invention. FIG. 2 is a horizontal sectional view of the airbag. FIG. 3 is an exploded perspective view showing the structure of panels of the airbag. FIG. 4 is an exploded perspective view in the course of sewing the airbag. FIGS. 5(a) to 18(b) are explanatory views showing the process of folding the airbag. FIG. 19 is a longitudinal sectional view of an airbag device including the folded airbag. FIG. 20 is a longitudinal sectional view the airbag of the airbag device when being inflated.

Figure 18A:
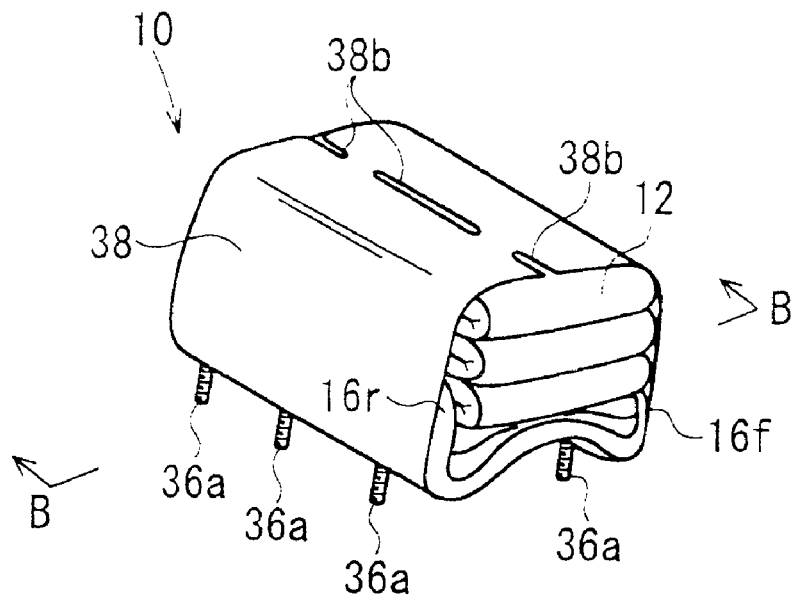
FIGS. 18(a) and 18(b) are explanatory views showing the process of folding the airbag in FIG. 1.
Figure 18B:
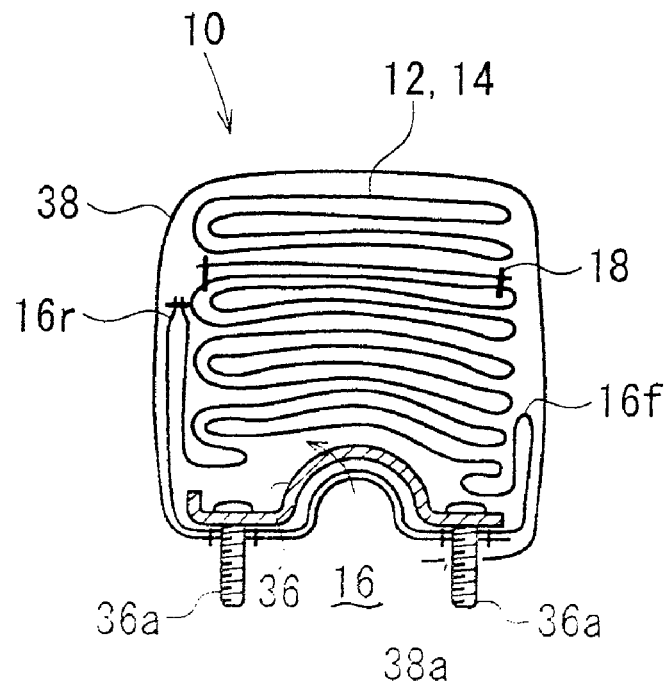

In addition, FIGS. 5(a) and 5(b) show a state of the airbag before being folded, FIGS. 6(a) to 17(b) show states of the airbag while being folded, and FIGS. 18(a) and 18(b) show a state of the airbag when being completely folded. In FIGS. 5(a) to 10(b), FIGS. 5(a), 6(a), 7(a), 8(a), 9(a) and 10(a) are side views of the airbag, and FIGS. 5(b), 6(b), 7(b), 8(b), 9(b) and 10(b) are sectional views taken along the lines B-B in FIGS. 5(a), 6(a), 7(a), 8(a), 9(a) and 10(a). FIGS. 11 to 13 and 14(a) are perspective views as seen from the leading side of the airbag (the passenger side), and FIG. 14(b) and FIGS. 15(a), 16(a), 17(a) and 18(a) are perspective views as seen from the base end (rear end) of the airbag. FIGS. 15(b), 16(b), 17(b) and 18(b) are sectional views taken along the lines B-B of FIGS. 15(a), 16(a), 17(a) and 18(a).

An airbag 10 includes a left airbag section 12 that is inflated on the front left side of a passenger, a right airbag section 14 that is inflated on the front right side of the passenger, and a base chamber 16 that communicates one end of the left airbag section 12 with one end of the right airbag section 14. The base chamber 16 is the base side of the airbag 10. Accordingly, the left airbag section 12 and the right airbag section 14 are respectively inflated in a direction away from the base chamber 16.

When the airbag 10 is inflated, a space 13 (FIG. 2) is formed between a front most end of the left bag 12 and a front most end of the right bag 14 without a bridging member such as a tie panel therebetween. The space 13 is opened toward the passenger (toward the upper side in FIG. 2).

When the airbag 10 is completely inflated, it is preferable that the spacing between a front most end of the left airbag section 12 and a front most end of the right airbag section 14 be 150 to 450 mm, particularly, 170 to 430 mm.

It is also preferable that the horizontal distance from one of the front most ends to a deepest portion of the space 13 be 280 to 480 mm, particularly, 310 to 450 mm. In a middle portion between the front most end to the deepest portion, the airbag sections 12 and 14 are connected to each other by a connecting band 18. In this embodiment, the connecting band 18 comprises a left half of connecting band 18L and a right half of connecting band 18R.

The outer faces of the left and right airbag sections 12 and 14 are provided with vent holes 15. Width-regulating tethers 20L and 20R that extend in the right-and-left direction are stretched within the airbag sections 12 and 14, respectively. The structure of the tethers 20L and 20R will be described later.

The panel structure, etc. of the airbag 10 will be described below. In the following description, the front side (leading side) of each panel means the leading side of the airbag 10 in the inflation direction and the rear side means the base side of the airbag in the inflation direction.

The airbag 10 comprises a total of four panels, i.e., an inside panel 50, a left outside panel 60, a right outside panel 70, and a base panel 80. Each of the left and right halves of connecting band 18L and 18R is connected to the inside panel 50.

The inside panel 50 is substantially gourd-shape elongated panel. A left side 50L and a right side 50R are formed by folding the inside panel 50 into two in the middle thereof. In the inside panel 50, the left side 50L constitutes the inner face of the left airbag section 12, and the right side 50R constitutes the inner face of the right airbag section 14. The entire peripheral edge of the inside panel 50 comprises a lower edge 56, a leading edge 51 and an upper edge 52 of the left side 50L, an upper edge 53 which lies in the vicinity of a folded-back portion constituting the deepest portion between valleys of the airbag, an upper edge 54, a leading edge 55 and a lower edge 58 of the right side 50R, and a lower edge 57 which lies in the vicinity of the folded-back portion.

The entire peripheral edge of the left outside panel 60 comprises a leading edge 61, an upper edge 62, a straight rear edge 63, and a lower edge 64 (here, reference numeral 64 is not shown). The entire peripheral edge of the right outside panel 70 comprises a leading edge 71, an upper edge 72, a straight rear edge 73, and a lower edge 74.

The base panel 80 has a left lateral face 80A, a bottom face 80B, a right lateral face 80C, a left flap 80D constituting a top left side, and a right flap 80E constituting a top right side. The base panel 80 is folded in such a manner that the lateral faces 80A and 80C form a substantially triangular shape. The face of the base panel 80 that faces the leading side of the airbag is opened.

The entire peripheral edge of the base panel 80 comprises facing edges 81 and 82 between substantially rectangular flaps 80D and 80E, front edges 83 and 84 (flap front edges) of the flaps 80D and 80E, rear edges 85 and 86 of the flaps 80D and 80E, a rear edge 87 facing the rear edges 85 and 86, front edges 88 and 89 (lateral front edges) of the lateral faces 80A and 80C, and a bottom front edge 80f that connects the lateral front edges 88 and 89 with each other.

In addition, as shown in FIG. 2, the bottom face 80B of the base panel 80 is provided with a gas introducing port 90. A frame-like reinforcing cloth 91 is overlapped and sewn to the gas introducing port 90 so as to surround it. The gas introducing port 90 is rectangular, and has bolt insertion holes 92 formed in the vicinity of its four corners.

In making the airbag 10, first, the rear edge 63 of the left outside panel 60 and the rear edge 73 of the right outside edge 70 are sewn to the lateral front edges 88 and 89, respectively, in a state where the base panel 80 is spread flat. Next, the facing edges 81 and 82 of the flaps 80D and 80E of the base panel 80 are sewn together. This brings the panels 60, 70 and 80 into the state shown in FIG. 4. In addition, "S" in FIG. 4 indicates sewing seams.

Next, as shown in FIG. 4, the left outside panel 60 is caused to face the left side 50L of the inside panel 50, and the leading edges 51 and 61, the upper edges 52 and 62 and the lower edges 56 and 64 are sewn together, respectively. The right outside panel 70 is caused to face the right side 50R of the inside panel 50, and the leading edges 55 and 71, the upper edges 54 and 72 and the lower edges 58 and 74 are sewn together, respectively. Also, the flap front edges 83 and 84 of the base panel 80 are sewn to the upper edge 53 in the vicinity of the folded-back portion of the inside panel 50, and the bottom front edge 80f of the base panel 80 is sewn to the lower edge 57 in the vicinity of the folded-back portion.

In this embodiment, each of the width-regulating tethers 20L and 20R comprises a pair of tether halves 21 and 22. As shown in FIG. 2, the one tether half 21 has one end sewn on the inner face of the inside panel 50. The other tether half 22 has one end sewn on the inner face of each of the outside panels 60 and 70. Reference numeral 23 represents reinforcing cloths that are disposed across the outside panels 60 and 70 from the one ends of the tether halves 22 and are sewn together therewith.

Next, the tether half 21 attached to the left side 50L and the other end of the tether half 22 attached to the left outside panel 60 are sewn together, and the tether half 21 attached to the right side 50R and the other end of the tether half 22 attached to the right outside panel 70 are sewn together.

By sewing the other ends of the tether halves 21 and 22 together, the left side 50L and the left outside panel 60 are connected to each other by the tether 20L, and the right side 50R and the right outside panel 70 are connected to each other by the tether 20R, thereby regulating the width of the left airbag section 12 and the right airbag section 14 when they are inflated.

By thus sewing, the airbag 10 (shown in FIG. 1) becomes to be an inside-out state, that is, to expose a sewing thread to the surface of the airbag. As shown in FIG. 4, the flap rear edges 85 and 86 and the rear edge 87 of the base panel 80 are not yet sewn together, but they form an opening M in this state.

Consequently, the airbag is inverted through the opening M. Next, the opening M is sewn and the left and right halves of connecting band 18L and 18R are sewn together, resulting in the airbag 10 in FIG. 1.

In this embodiment, an inflator 34 (see FIGS. 19 and 20) is disposed within the base chamber 16 through the gas introducing port 90 at the bottom of the base chamber 16. In this embodiment, the inflator 34 is rod-shaped, and disposed such that the longitudinal direction is the width direction (the right-and-left direction) of a vehicle. Reference numeral 36 represents a fixing plate as a fixture to fix the bottom face of the base chamber 16 and the inflator 34 to an airbag mounting face of the accommodating case 40 (the bottom face of an accommodating case 40 in this embodiment) (see FIGS. 19 and 20).

As shown in FIG. 1 and FIGS. 15(*b*), 16(*b*), 17(*b*) and 18(*b*), the fixing plate 36 has C-shaped bands (reference numerals are omitted) fitted on peripheral sides of the inflator 34 at the longitudinal opposite ends, flanges (reference numerals are omitted) that extend along the bottom face of the base chamber 16 (and the airbag mounting face of the case 40) from both ends of the C-shaped bands, and stud bolts 36a protruding downwardly from the flanges, respectively. In addition, each flange is provided with a pawl (reference numeral is omitted) to lock the fixing plate 36 to a peripheral edge of the gas introducing port 90, and the peripheral edge of the gas introducing port 90 is provided with a locking hole (reference numeral is omitted) for the pawl.

Prior to folding of the airbag 10 that has been completely sewn, the fixing plate 36 is introduced into the base chamber 16 from the gas introducing port 90, and attached to the peripheral edge of the gas introducing port 90. At this time, the flanges of the fixing plate overlap peripheral edge of the gas introducing port 90 while the stud bolts 36a are inserted into the insertion holes 92, respectively, and the pawl of the flanges are hooked to the locking holes, respectively, thereby fixing the fixing plate 36. The stud bolts 36a extend to the outside of the airbag 10 through the insertion holes 92.

By fastening the fixing plate 36 to the airbag mounting face of the case 40 with the stud bolts 36a, the bottom face of the base chamber 16 and the inflator 34 are fixed to the airbag mounting face. Reference numeral 36b in FIGS. 19 and 20 represent nuts fitted around the stud bolts 36a, respectively.

In this embodiment, a protector cloth 38 is connected to a rear end of the base chamber 16 to wrap a folded body of the airbag 10. In this embodiment, the protector cloth 38 is a band-like panel that extends rearwardly from the rear end of the base chamber 16. A base end of the protector cloth is sewn on the outer face of the airbag at the peripheral edge of the gas introducing port 90.

In addition, the base end of the protector cloth 38 is provided with an opening (not shown) overlapping the gas introducing port 90, and holes (not shown) overlapping the pawl locking holes and the stud bolts 92, respectively. The inflator 34 is disposed within the base chamber 16 through the opening of the protector cloth 38 and the gas introducing port 90. The stud bolts 36a extend to the outside of the airbag 10 through the bottom face of the base chamber 16 and the protector cloth 38.

Insertion holes 38a for the stud bolts 36a are bored in a leading end of the protector cloth 38.

The protector cloth 38 is adapted to be ruptured when it receives a predetermined tension or more in its extending direction suffered. Specifically, perforated slits 38b are formed in the extending middle portion of the protector cloth 38 so as to run in a direction intersecting the extending direction of the cloth. When the protector cloth 38 receives a predetermined tension or more, it is torn and ruptured along the slits 38b.

The protector cloth or shape-retaining panel 38 is provided with an opening 39 for allowing the state of the folded body wrapped by the shape-retaining panel 38 to be observed. The opening 39 is disposed in region of the shape-retaining panel 38 that overlaps the front face of the folded body on the passenger side. In addition, the slits 38b are arranged to be located on the shape-retaining panel 38 to extend across the top face of the folded body. The opening 39 is located between the slits 38b and the insertion holes 38a along the length of the panel 38 with the insertion holes 38a being adjacent the leading end of the panel 38, and the opening 39 being further spaced lengthwise from the panel leading end and the slits 38b being spaced lengthwise even further from the panel leading end than the opening 39.

The airbag 10 is folded and accommodated within the case 40 along with the inflator 34, and the accommodated airbag is fixed to the airbag mounting face by the nuts 36b and the bolts 36a of the fixing plate 36, thereby forming an airbag device 1.

In addition, in this embodiment, the airbag device 1 is for a front passenger seat of a vehicle that is installed on the back of an instrument panel 2 in front of the front passenger seat. A portion of the instrument panel 2 that covers the case 40 servers as a door 2a that is pushed and torn open toward the interior of the vehicle by the airbag 10 when the airbag 10 is inflated. Reference numeral 2b in FIG. 19 represents a tear line that induces the tearing of the door 2a.

It should be noted herein that a structure may be employed in which the case 40 is mounted with a lid (case member) adapted to be pushed and torn open by the airbag 10 when the airbag 10 is inflated and the instrument panel 2 is provided with an opening for installation of the airbag device 1 so that the airbag device 1 is covered with the lid in installing the airbag device 1 into the opening.

As shown in FIG. 19, a windshield 3 exists above the instrument panel 2. The windshield inclines upward and rearward from an end of the instrument panel 2 on the front side of the vehicle.

Next, the process of folding the airbag 10 will be described with reference to FIGS. 5(*a*) to 18(*b*).

In folding the airbag 10, first, the left airbag section 12 and the right airbag section 14 are spread flat such that their respective left and right lateral faces (the left side 50L and the left outside panel 60 or the right side 50R and the right outside panel 70) overlap each other. Then, as shown in FIGS. 5(*a*) to 11, the left airbag section 12 and the right airbag section 14 are respectively folded so as to have a reduced vertical width, resulting in primary folded bodies that are elongated in forward and rearward directions.

In the primary folded bodies, first as shown in FIGS. 5(*a*), 5(*b*), 6(*a*), and 6(*b*), a portion of the left airbag section 12 (lower airbag section) that is lower than the connecting band 18 (the connecting band between the left airbag section 12 and the right airbag section 14) is folded back upwardly along a folding line $L_1$ that connects a lower edge of the connecting band 18 and a lower edge of the fixing plate 36 at the front end, and is overlapped with the left outside panel 60.

Next, as shown in FIGS. 6(*a*), 6(*b*), 7(*a*), and 7(*b*), a portion closer to the lower edge 12b than the folding line $L_2$ is folded back downwardly along a folding line $L_2$ that extends parallel to the folding line $L_1$ with a predetermined spacing on the lower edge 12b side (on the upper side) of the folding line $L_1$ so that the portion is overlapped with the outside (the side opposite to the remaining right airbag section 14). At this time, the position of the folding line $L_2$ is determined, for example, by placing a ruler or a plate, etc. having a predetermined width along the folding line $L_1$. Similar to this, the following folding lines $L_3$ to $L_7$ are also determined by placing a ruler or a plate, etc. having a predetermined width along a previous folding line.

Next, as shown in FIGS. 7(*a*), 7(*b*), 8(*a*), and 8, the portion that protrudes downwardly from the folding line $L_1$ is folded back upwardly after the second folding. At this time, a portion closer to the lower edge 12b than the folding line $L_3$ is folded back upwardly so as to be overlapped with the outside along a folding line $L_3$ that extends parallel to the folding line $L_2$ with a predetermined spacing (in this embodiment, the spacing that is narrower than the spacing between the folding line $L_2$ and the folding line $L_1$) on the lower edge 12b side (on the lower side) of the folding line $L_2$.

Next, as shown in FIGS. 8(*a*) to 9(*b*), a portion of the left airbag section 12 (an upper airbag section) closer to an upper edge 12t than the connecting band 18 is folded back toward the left outside panel 60 sequentially along folding lines $L_4$, $L_5$, ..., (only folding lines up to $L_7$ are shown in FIGS. 8(*a*) and 8(*b*)) that extend parallel to the folding line $L_1$ by a predetermined width downwardly from the upper edge 12t, resulting in an elongated folded roll. In this embodiment, the spacing of the folding lines $L_4$ to $L_7$ is set such that, when the upper folded roll reaches a portion near an upper portion of the lower folded body as shown in FIGS. 9(a) and 9(b), its vertical width becomes approximately equal to the vertical width of the lower folded body.

Thereafter, as shown in FIGS. 9(a), 9(b), 10(a), and 10(b), the upper folded roll is folded back downwardly along a line $L_8$, that is located between the folded roll and the lower folded body and extends parallel to the line $L_1$, so as to be overlapped with the outside of the lower folded body.

In addition, the roll folding may be performed, for example, by winding the upper airbag section around a predetermined width of a band-like plate from the upper edge 12t. In this case, the upper airbag section may be wound around a band-like plate and roll-folded. The resulting folded roll may be overlapped with the outside of the lower folded body. The band-like plate may be then pulled out of the folded roll. Thus, the folding work of the upper airbag section can be efficiently performed.

Figure 11:
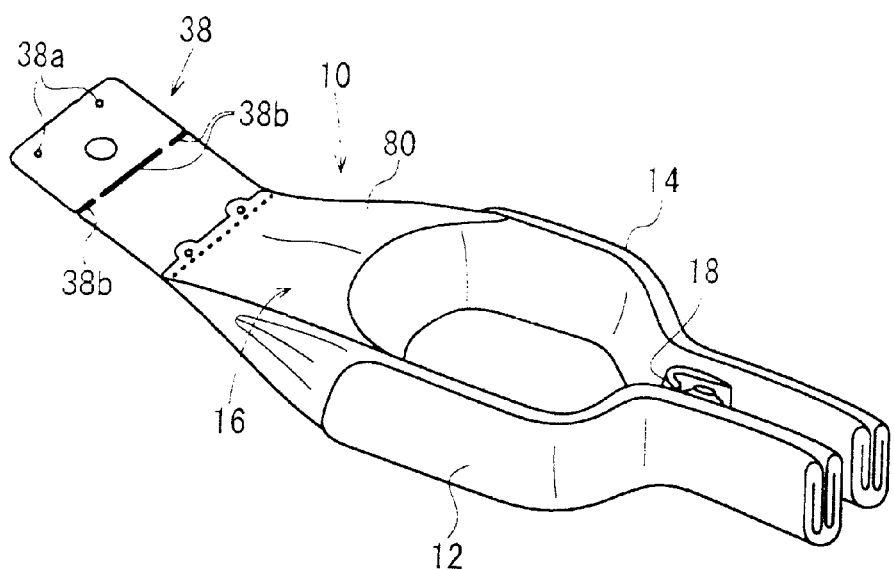
FIG. 11 is an explanatory view showing the process of folding the airbag in FIG. 1.

The right airbag section 14 is also primarily folded through the process similar to the left airbag section 12. FIG. 11 shows that the primary folding of the left airbag section 12 and the right airbag section 14 has been completed. In addition, in FIGS. 5(a) to 10(b), reference numerals 14b and 14t represent a lower edge and an upper edge, respectively, of the right airbag section 14.

The vertical width of the primary folded bodies of the left airbag section 12 and the right airbag section 14 is set in accordance with the width of the case 40 to receive the airbag 10.

Figure 12:
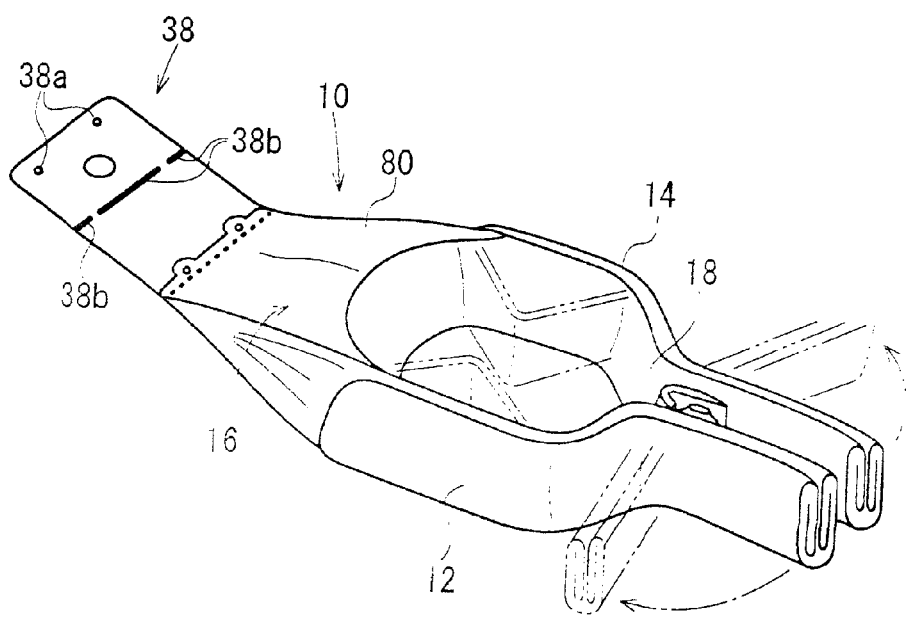
FIG. 12 is an explanatory view showing the process of folding the airbag in FIG. 1.
Figure 13:
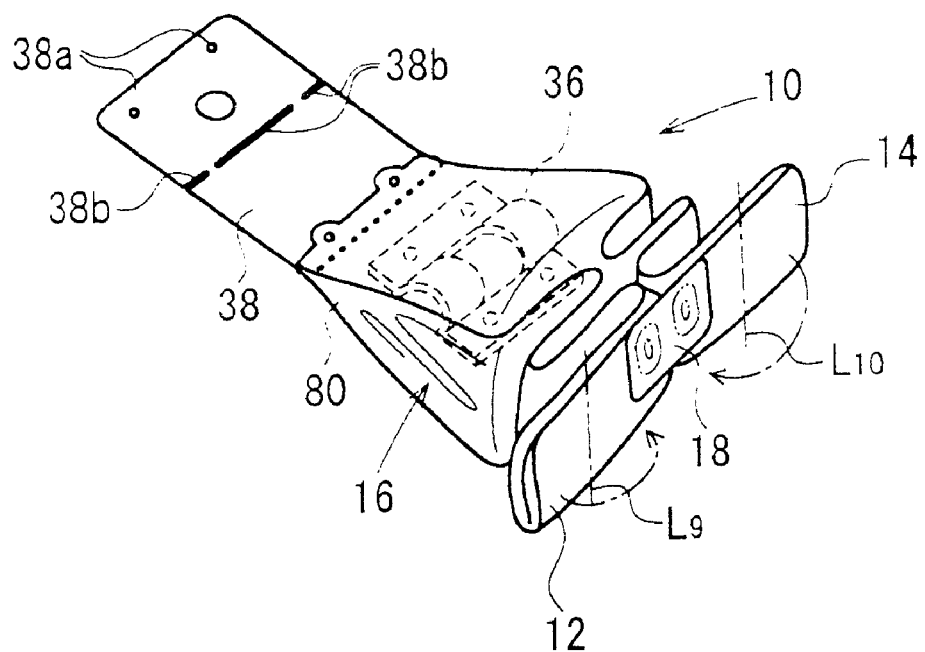
FIG. 13 is an explanatory view showing the process of folding the airbag in FIG. 1.
Figure 14A:
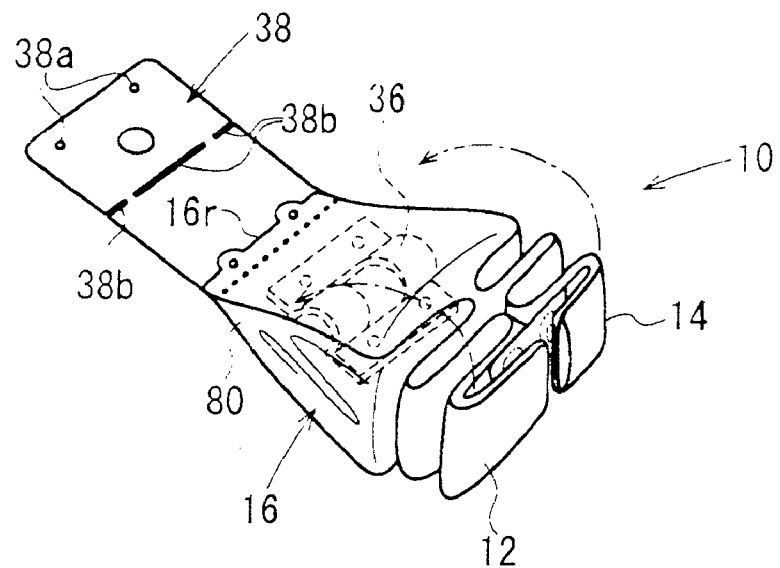
FIGS. 14(a) and 14(b) are explanatory views showing the process of folding the airbag in FIG. 1.
Figure 14B:
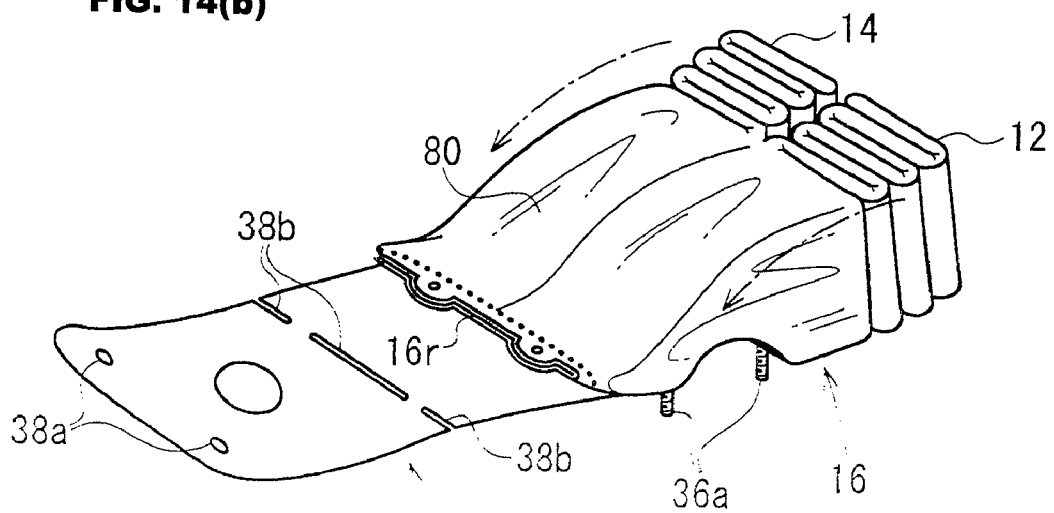

Next, as shown in FIGS. 12 and 13, in the primary folded bodies of the left airbag section 12 and the right airbag section 14 that are long in forward and rearward directions, portions closer to the leading ends of the primary folded bodies than the connecting band 18 are separated from each other to the right and left in the shape of open legs, and portions closer to rear ends of the primary folded bodies than the connecting band 18 are folded in a accordion fashion (in a zigzag fashion) so as to have a reduced longitudinal width. Next, as shown in FIGS. 13, 14(a) and 14(b), the portions of the airbag sections 12 and 14 closer to the leading ends than the connecting band 18 are folded back to the front of the connecting band 18 along the vertical folding lines $L_9$ and $L_{10}$, respectively, that are located in the middle of the portions closer to the leading ends. As a result, a secondary folded body shown in FIG. 13 is formed.

Other folding method than the accordion folding may be adopted for the secondary folding method of the left airbag section 12 and the right airbag section 14.

Figure 15A:
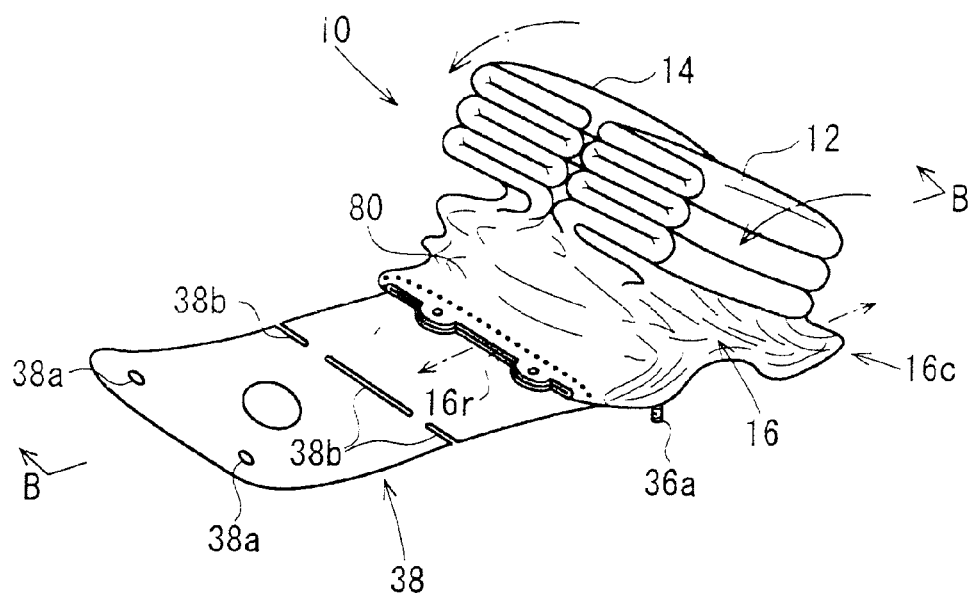
FIGS. 15(a) and 15(b) are explanatory views showing the process of folding the airbag in FIG. 1.
Figure 15B:
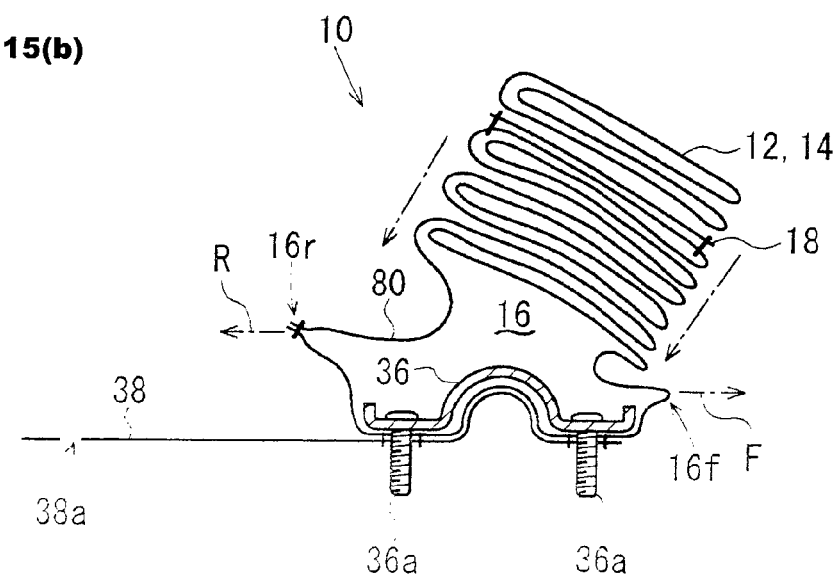
Figure 16A:
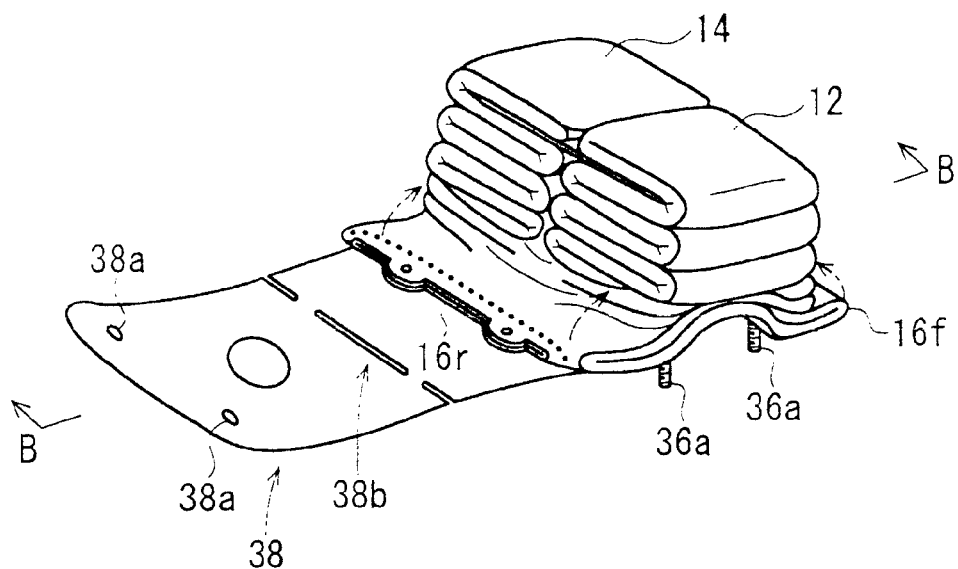
FIGS. 16(a) and 16(b) are explanatory views showing the process of folding the airbag in FIG. 1.
Figure 16B:
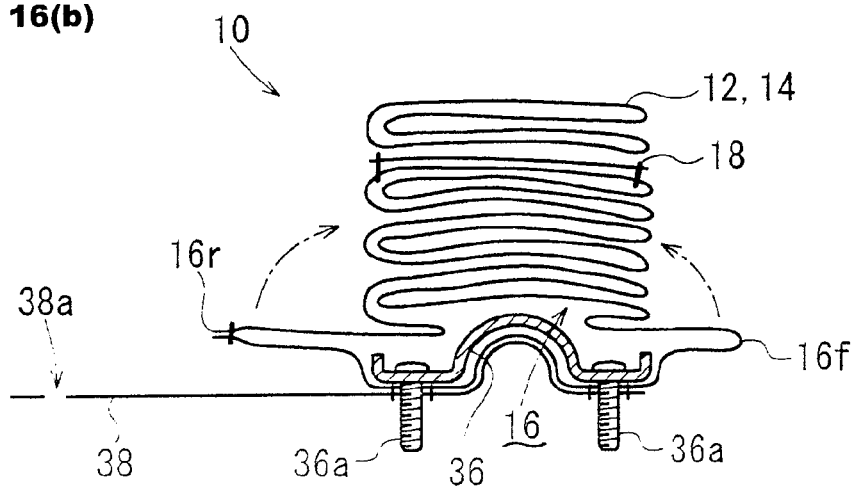
Figure 17A:
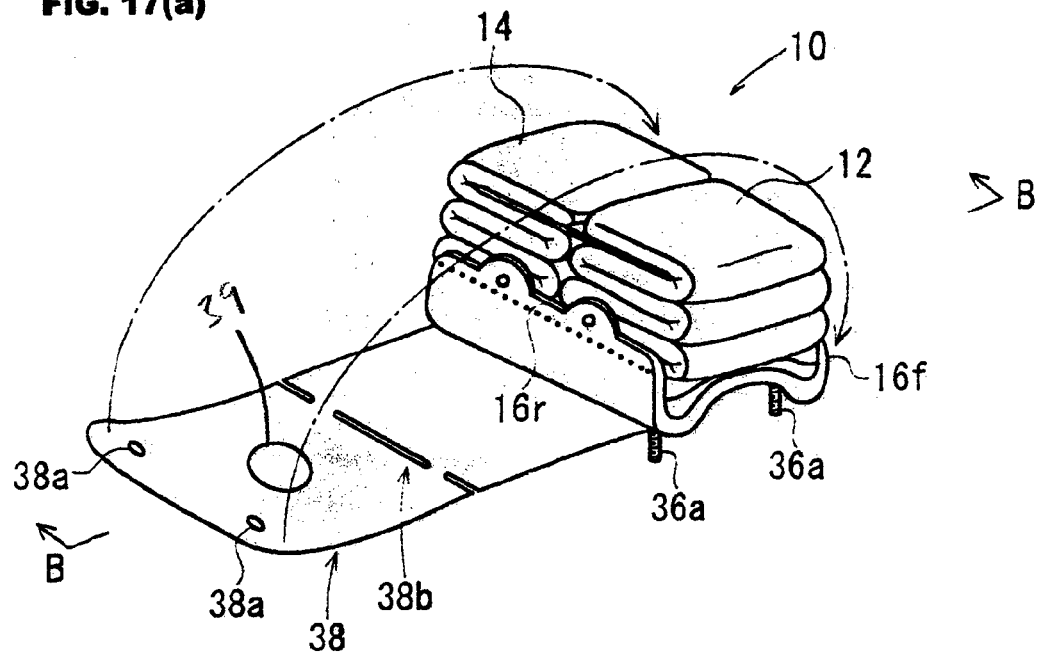
FIGS. 17(a) and 17(b) are explanatory views showing the process of folding the airbag in FIG. 1.
Figure 17B:
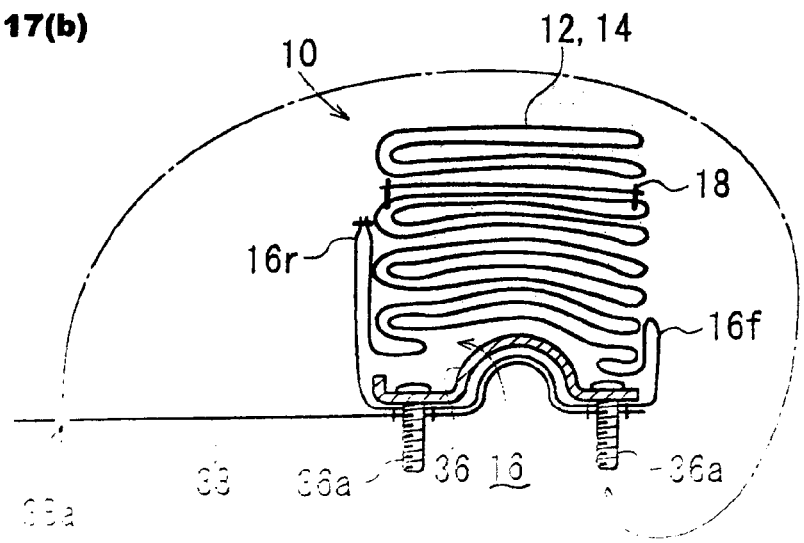

Next, as shown in FIGS. 14(a) to 16(b), the base panel 80 is flattened so that the base chamber 16 becomes a so-called "beaten state," and the secondary folded body of the left airbag section 12 and the right airbag section 14 is placed on the flattened base panel. As a result, as shown in FIG. 16(b), the base chamber 16 and the secondary folded body overlap the fixing plate 36. FIGS. 14(a) and 14(b) shows a state of the base panel 80 before being flattened, FIGS. 15(a) and 15(b) shows a state of the base panel 80 while being flattened, and FIGS. 16(a) and 16(b) shows a state of the base panel after being flattened.

When the base panel 80 is flattened, as shown in FIG. 15(b), the portion between the front edges 83 and 84 of the flaps 80D and 80E and a rear edge of the gas introducing port 90 of the base panel 80 are loosened. As indicated by the arrow R in FIG. 15(b), a rear end 16r of the base chamber 16 is pulled rearwardly, and the base chamber 16 protrudes rearwardly by the loosened distance.

In addition, since looseness is also caused in the portion between the bottom front edge 80f and the front edge of the gas introducing port 90 of the base chamber 16, the base chamber 16 also protrudes forwardly by pulling a front end 16f of the base chamber 16 forwardly as indicated by the arrow F. In this case, since the length of the base panel 80 from the rear edge of the gas introducing port 90 to the flap front edges 83 and 84 is larger than the length of the base panel 80 from the front edge of the gas introducing port 90 to the bottom front edge 80f, the length of the base chamber 16 that protrudes rearwardly (in the R-direction) becomes larger than the length of the base chamber 16 that is pulled out forward (in the F-direction).

Thereafter, the protruding portions of the base chamber 16 closer to the rear end 16r and the front end 16f are respectively folded back upwardly and overlapped with the rear lateral faces and the front lateral face of the secondary folded body.

Thereafter, as shown in FIGS. 17(a), 17(b), 18(a), and 18(b), the protector cloth 38 is pulled forwardly around the folded body of the airbag 10 such that it is covered on the folded body. Then, the stud bolts 36a extending from the bottom of the base chamber 16 are inserted through the insertion holes 38a, respectively, of the protector cloth 38 at its leading end, and thereby the protector cloth 38 is caught by the stud bolts 36a. As a result, the folded body of the airbag 10 is wrapped (retained in shape) by the protector cloth 38, completing the folding of the airbag 10.

In the airbag device 1, as described above, since the first folding is performed along the folding line $L_1$ that connects the lower edge of the connecting band 18 to the lower edge of the front end of the fixing plate 36 when the left airbag section 12 and the right airbag section 14 are primarily folded, the position of the first folding is determined to be uniform. In addition, the folding of the primary folding after the first folding can be performed parallel to the first folding line $L_1$ which serves as a reference line. Furthermore, since the position of the first folding is determined to be uniform, the left airbag section 12 and the right airbag section 14 can be folded symmetrically bilateral. As a result, the left airbag section 12 and the right airbag section 14 can be inflated equally.

If a vehicle equipped with the airbag device 1 encounters an emergency situation, the inflator 34 operates to discharge gas. As a result, gas is discharged into the base chamber 16 from the inflator 34. The gas from the inflator 34 flows into the left airbag section 12 and the right airbag section 14 from the base chamber 16. Then, this gas causes the left airbag section 12 and the right airbag section 14 to inflate on the left and right sides, respectively, in front of a passenger.

When the airbag 10 of the airbag device 1 begins to be inflated, the protector cloth 38 is ruptured along the slits 38b due to the inflation pressure of the airbag 10, thereby releasing the folds of the airbag 10. Next, the base chamber 16 is inflated, which in turn pushes the secondary folded body of the left airbag section 12 and the right airbag section 14 out of the case 40 while pushing the door 2a of the inflator open.

In this embodiment, when the base chamber 16 is folded, the portion of the base chamber 16 closer to its rear end 16r protrudes rearwardly and overlapped with the rear lateral face of the secondary folded body. Thus, when the base chamber 16 is inflated, as shown in FIG. 20, the rear end 16r swells greatly on the rear side (vehicle front side) of the secondary folded body. Thereby, the secondary folded body is pushed out by the inflated rear end 16r so that the left airbag section 12 and the right airbag section 14 are smoothly deployed toward the passenger.

In this embodiment, since the portion of the base chamber 16 closer to its front end 16f also protrudes a bit forwardly, as shown in the drawing, the portion of the base member closer to the front end 16f is inflated so as to support the secondary folded body on the front bottom of the secondary folded body.

Thereafter, the left airbag section 12 and the right airbag section 14 are inflated to the left and right, respectively, in front of a passenger, whereby the left airbag section 12 receives the left chest of a passenger and the right airbag section 14 receives the right chest of the passenger. Hard and strong ribs exist in the left and right chests. The left airbag section 12 and the right airbag section 14 receive and absorb an impact on the passenger through the ribs. Also, the space 13 exists between the leading ends of the inflated left and right airbag sections 12 and 14 so that the breastbones in the center of the passenger's chest faces the space 13. Thus, if the passenger's body rushes into the airbag 10, the breastbone region of the chest does not receive reaction force too much from the airbag 10. As a result, a burden on the breastbones becomes small.

In this embodiment, in a state in which the airbag 10 is inflated, the spacing between the front most ends of the left airbag section 12 and the right airbag section 14 is set to 150 to 450 mm. Thus, the inflated left airbag section 12 directly faces a central region of the left chest, and the inflated left airbag section 14 directly faces a central region of the right chest. As a result, the region of the ribs of the upper half of the passenger's body is reliably and securely received by the airbag 10.

The above embodiment is just an example, and the invention is not limited to the above embodiment.

For example, in the above embodiment, even though the upper halves of the left airbag section and the right airbag section are folded in a roll-shape, the upper halves can be folded in a zigzag-shape like the lower halves. It is also possible that the upper halves are folded back downward along the connecting band 18 in the first folding of the primary folding, and then the upper halves are folded in a zigzag-shape. In this case, the lower halves can be folded in a roll-shape or zigzag-shape.

In the above embodiment, even though the folding line $L_1$ of the first folding (hereinafter referred to as first folding line) of the left airbag section 12 and the right airbag section 14 is a line that connects the lower edge of the connecting band 18 and the lower edge of the front end of the fixing plate 36, instead, an indicative portion that indicates the position of the first folding line $L_1$ can be provided. Vent holes can be used as the indicative portion.

Figure 21:
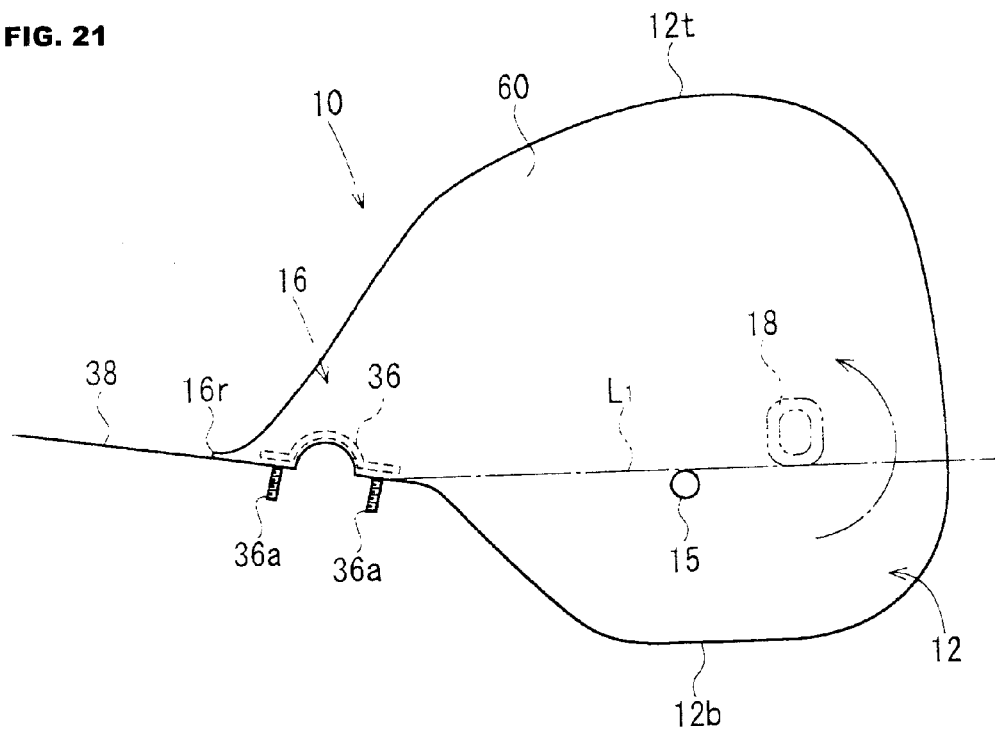
FIG. 21 is a side view illustrating another method of defining the positions of first folding lines of left and right airbag sections.

For example, in the embodiment of FIG. 21, vent holes 15 are provided at predetermined positions toward the base end of the left airbag section 12 and the right airbag section 14 from the connecting part of the connecting band 18 between the left airbag section 12 and the right airbag section 14 of the left outside panel 60 and the right outside panel 70. (FIG. 21 shows only the left outside panel 60 (left airbag section 12)). In the embodiment, the first folding lines $L_1$ of the left airbag section 12 and the right airbag section 14 are lines that connect the upper edges of the vent holes 15 and the lower edge of the connecting band 18.

It is needless to say that the first folding line $L_1$ can be defined on the basis of, other than the above, for example, the vent holes 15 and the fixing plate 36 or the other portions.

Figure 22:
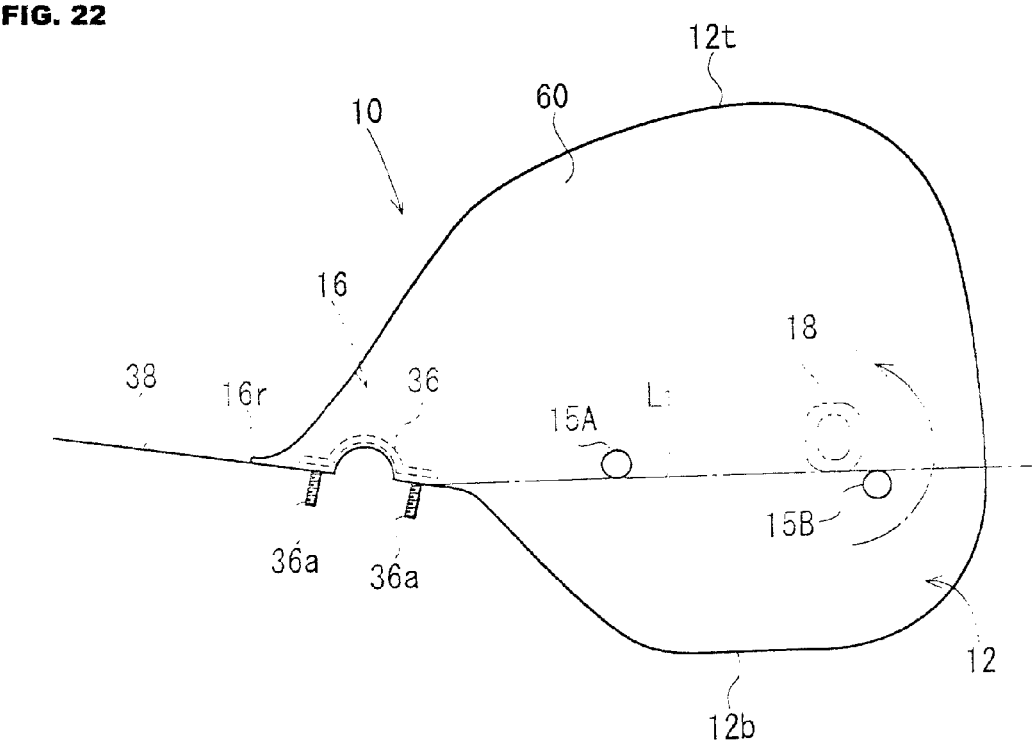
FIG. 22 is a side view illustrating still another method of defining the positions of the first folding lines of the left and right airbag sections.
Figure 23:
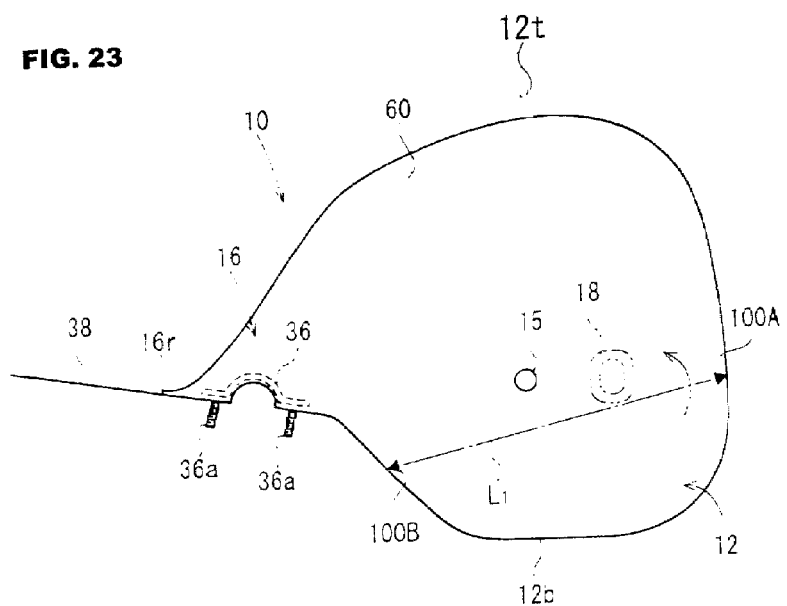
FIG. 23 is a side view illustrating an example of the structure of indicative portions indicating the positions of the first folding lines of the left and right airbag sections.
Figure 24:
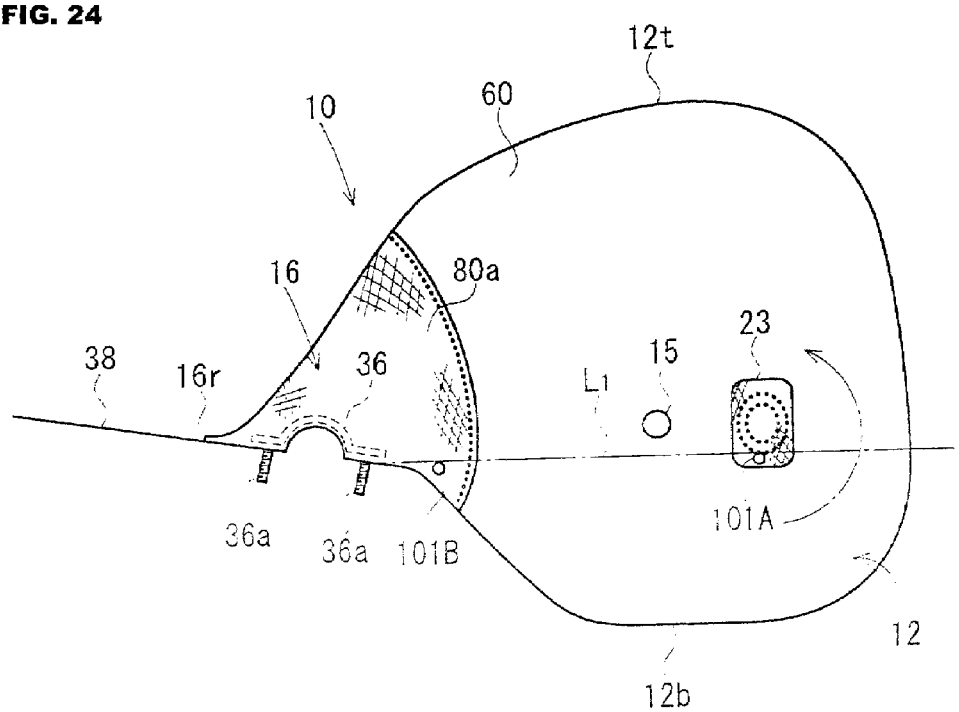
FIG. 24 is a side view illustrating another example of the structure of indicative portions indicating the positions of the first folding lines of the left and right airbag sections.

In addition, in the invention, the indicative portion for indicating the position of the first folding of the left airbag section and the right airbag section can be provided at the outside surfaces of the bags beforehand. FIGS. 22 to 24 show examples of the indicative portion individually.

In the embodiment of FIG. 22, two vent holes 15A and 15B are provided at different positions in the base end side and the leading end side of the bags 12 and 14 (in a predetermined position relationship) in the left outside panel 60 and the right outside panel 70 (FIG. 22 shows only the left outside panel 60 (left airbag section 12)). In the embodiment, the first folding lines $L_1$ of the left airbag section 12 and the right airbag section 14 are lines that connect the lower edge of the vent hole 15A at the base end side and the upper edge of the vent hole 15B at the leading end side. In this case, the vent holes 15A and 15B serve as the indicative portion.

In the embodiment of FIG. 23, a pair of marks 100A and 100B that indicates the positions of both end parts of the first folding of the left airbag section 12 is provided as the indicative portion in the vertical middle of the edges of the left outside panel 60 at the leading end side and the base end side. In the embodiment, although the marks 100A and 100B are printed on the surface of the left outside panel 60, the marks 100A and 100B can be provided by the other methods such as embroidery, sticker, stamp or the like.

In the embodiment, the first folding of the left airbag section 12 is performed along the folding line $L_1$ that connects the marks 100A and 100B.

Meanwhile, even though FIG. 23 shows only the left outside panel 60 (left airbag section 12), the pair of marks 100A and 100B that indicates the positions of both end parts of the first folding of the left airbag section 14 is also provided at the right outside panel 70 like the left outside panel 60, and the first folding of the right airbag section 14 is performed along the folding line $L_1$ that connects the marks 100A and 100B.

As described above, if the marks 100A and 100B that indicate the positions of the first folding of the left airbag section 12 and the right airbag section 14 are provided at the outside surfaces of the bags 12 and 14 beforehand, the position of the first folding of the left airbag section 12 and the right airbag section 14 can be determined uniformly.

In the embodiment of FIG. 24, a reinforcing cloth 23 that reinforces the connecting part between the left outside panel 60 and the width-regulating tether 20L is attached to the outside surface of the left outside panel 60, and a first small opening 101A is provided in the vicinity of the lower edge of the reinforcing cloth 23 as the indicative portion that indicates the position of the first folding of the left airbag section 12 at the leading end side of the left airbag section 12. Meanwhile, the first small opening 101A is provided at the reinforcing cloth 23 when the reinforcing cloth 23 is manufactured and the first small opening 101A does not penetrate the left outside panel 60.

In the embodiment, the base panel 80 defining the base chamber 16 is made by overlapping a plurality of panels for reinforcement. A second small opening 101B is provided at the lower portion of the left surface of the base chamber 16 at the front edge side in the panel 80a disposed at the outermost side of the base panel 80 as the indicative portion that indicates the position of the first folding of the left airbag section 12 at the base end side of the left airbag section 12. The second small opening 101B is also provided at the panel 80a when the panel 80a is manufactured and the second small opening 101B does not penetrate the other panels composing the base panel 80.

In the embodiment, the first folding of the left airbag section 12 is performed along the folding line $L_1$ that connects the first and second small openings 101A and 101B.

Meanwhile, even though FIG. 24 shows only the left outside panel 60 (left airbag section 12), the reinforcing cloth 23 that reinforces the connecting part between the right outside panel 70 and the width-regulating tether 20R is also attached to the outside surface of the right outside panel 70 like the left outside panel 60, and the first small opening 101A that indicates the position of the first folding of the right airbag section 14 at the leading end of the right airbag section 14 is provided in the vicinity of the lower edge of the reinforcing cloth 23. In addition, the second small opening 101B that indicates the position of the first folding of the right airbag section 14 at the base end side of the right airbag section 14 is provided at the lower portion of the right surface of the base chamber 16 at the front edge side in the panel 80a disposed at the outermost side of the base panel 80.

The first folding of the right airbag section 14 is also performed along the folding line $L_1$ that connects the first and second small openings 101A and 101B.

Therefore, even in the embodiment, the position of the first folding of the left airbag section 12 and the right airbag section 14 can be determined uniformly by the first and second small openings 101A and 101B.

Meanwhile, the indicative portion is not limited to the above configuration. For example, the first folding line $L_1$ can be specifically drawn on the outside surface of the left airbag section 12 and the right airbag section 14. Otherwise, the upper and lower surfaces of the bags, from the folding line can have different colors. It is needless to say that the indicative portion can adopt the other configuration.

In the invention, the first folding line of the left airbag section and the right airbag section can be defined on the basis of the indicative portion, the connecting band, vent hole, the fixing plate or the like.

In the invention, as well as the indicative portion that indicates the position of the first folding, indicative portions that indicate the position of the secondary or later folding can be provided.

In the embodiment, even though the primary folded body is elongated in the forward and rearward direction, the primary folded body can be elongated in the other directions (for example, the upward and downward directions).

The above embodiments illustrate applications of the invention for a front passenger airbag device of automobiles. However, the invention is naturally applicable to airbag devices for passengers other than the front passenger and to airbag devices for receiving passengers of high-speed mobile objects other than the automobile.

What is claimed is:

1. An airbag device comprising:
    an airbag having airbag panels that cooperate to form an interior space for being supplied with inflation gas to inflate the airbag;
    a base section of the airbag;
    an inflator for inflating the airbag with inflation gas;
    first and second lateral sections of the inflated airbag;
    a folded body of the airbag including the base section and the airbag lateral sections folded in a predetermined generally cubicle configuration having opposite top and bottom faces, opposite side faces, and opposite front and rear faces with the base section substantially flattened and the lateral sections accordion folded on top of the flattened base section so that multiple layers of adjacent, inner ends of the folded lateral sections form an interface therebetween extending up vertically from the base section therebelow at the opposite front and rear faces of the folded body;
    a shape-retaining panel directly connected to one of the airbag panels used for forming the base section and extending out rearwardly therefrom for being wrapped forwardly about the folded body to maintain the predetermined cubicle configuration thereof prior to airbag deployment;
    a fixing plate in the interior space of the airbag in the base section thereof for mounting the inflator thereto outside the airbag interior spaces so that the inflator does not extend therein with the fixing plate having spaced front and rear fasteners extending out from the interior space of the airbag;
    opposite sides of the panel that define a width of the panel thereacross which is substantially the same as spacing between outside ends of the folded lateral sections at the opposite side faces of the folded body so that with the shape-retaining panel being forwardly wrapped about the folded body, the opposite side faces of the folded body are exposed and not covered by the panel;
    a free end of the panel extending between the opposite sides thereof with a length of the panel defined between the panel free end and the flattened base section sized so that the panel can only reach to the front fastener with only a single layer of the panel forwardly wrapped to completely cover the rear face, the top face, and the front face of the folded body;
    a fastener aperture adjacent to the panel free end with the panel length sized and the fastener aperture positioned to allow the front fastener to be inserted through the fastener aperture with the single layer of the panel forwardly wrapped about the folded body to completely cover the rear face, the top face, and the front face thereof;
    perforations in the panel arranged lengthwise along the panel between the base section and the fastener aperture so that with the panel forwardly wrapped about the folded body the perforations extend across the top face thereof, and deployment of the airbag causes the inflating lateral sections to rupture the panel along the perforations; and
    a viewing opening in the panel that is defined by a perimeter that is completely spaced from the panel sides and free end and which is arranged lengthwise along the panel between the perforations and the fastener aperture and disposed centrally between the opposite sides so that with the panel secured to the forward fastener, the viewing opening will be generally aligned over the interface between the adjacent, inner ends of the folded lateral sections at the front face of the folded body.

2. The airbag device of claim 1 wherein the viewing opening is larger than any one of the perforations with the perforations being narrow slit openings and the larger viewing opening being wider than the narrow slit openings.

3. The airbag device of claim 1 wherein the perforations are narrow slit openings and the viewing openings is wider than the narrow slit openings.

4. The airbag device of claim 1 wherein the forwardly wrapped shape-retaining panel includes corner portions extending about corresponding corner portions of the folded body, and the viewing opening is located on the panel wrapped about the folded body so as to not intersect any of the panel corner portions.

5. A method of forming a folded airbag, the method comprising:
    flattening a base section of an airbag;
    folding lateral sections of the airbag on top of the flattened airbag base section to form a generally cubical folded airbag body with opposite bottom and top faces, opposite side faces, and opposite front and rear faces;
    orienting inner ends of the folded lateral sections adjacent to each other so that a central interface therebetween extends vertically up from the flattened base section thereunder at the opposite front and rear faces of the cubicle folded airbag body;

connecting a protector cloth to the bottom face of the cubicle folded airbag body to extend out rearwardly therefrom;

wrapping the protector cloth forwardly about the folded airbag body by pulling the protector cloth initially up vertically along the rear face, then forwardly along the top face, and finally down vertically along the front face to completely cover the rear face, the top face, and the front face of the folded body; and securing a leading end portion of the protector cloth to a forward fastener spaced from a rearward fastener that project down from the bottom face of the folded body so that only a single layer of the protective cloth is wrapped about the rear, top and front faces of the folded airbag body leaving the opposite side faces uncovered by the protector cloth and exposed therefrom.

6. The method of claim 5 wherein the protector cloth is forwardly wrapped to arrange perforations therein to extend over the top face of the folded body.

7. The method of claim 5 wherein the protector cloth is forwardly wrapped to arrange a central opening thereon to be over the front face of the folded body for being generally aligned with the central interface between the adjacent inner ends of the airbag lateral sections.

* * * * *